(12) United States Patent
Watanabe et al.

(10) Patent No.: US 7,020,833 B2
(45) Date of Patent: Mar. 28, 2006

(54) DATA SYNCHRONIZATION DETECTION METHOD, INFORMATION RECORDING METHOD, AND INFORMATION REPRODUCTION METHOD

(75) Inventors: Yoshiju Watanabe, Ninomiya (JP); Yasuyuki Ito, Chigasaki (JP)

(73) Assignees: Hitachi, Ltd., Tokyo (JP); Hitachi Video and Information System, Inc., Yokohama (JP)

( * ) Notice: Subject to any disclaimer, the term of this patent is extended or adjusted under 35 U.S.C. 154(b) by 654 days.

(21) Appl. No.: 09/930,215

(22) Filed: Aug. 16, 2001

(65) Prior Publication Data

US 2002/0049954 A1 Apr. 25, 2002

(30) Foreign Application Priority Data

Oct. 25, 2000 (JP) ............................. 2000-325255

(51) Int. Cl.
*G06F 11/00* (2006.01)

(52) U.S. Cl. ...................... 714/798; 714/707; 714/775; 375/354; 375/376; 370/514

(58) Field of Classification Search ................ 714/707, 714/775, 798, 73 T; 375/354, 363, 369, 375/365, 376, 368, 373; 370/506, 507, 509–514
See application file for complete search history.

(56) References Cited

U.S. PATENT DOCUMENTS

| | | | |
|---|---|---|---|
| 4,707,681 A | 11/1987 | Eggenberger et al. | |
| 5,844,920 A | 12/1998 | Zook et al. | |
| 5,963,602 A * | 10/1999 | Aoki et al. | ................. 375/354 |

FOREIGN PATENT DOCUMENTS

| | | |
|---|---|---|
| JP | 10-255400 | 9/1998 |
| JP | 11-243345 | 9/1999 |

* cited by examiner

*Primary Examiner*—Guy J. Lamarre
(74) *Attorney, Agent, or Firm*—Mattingly, Stanger, Malur & Brundidge, P.C.

(57) ABSTRACT

Data synchronization detection is provided between data identification and code demodulation in a data reproduction system, which performs data synchronization detection using code-modulated data. A specified bit pattern generated in a data codeword is calculated in each phase (bit), using a specified bit sequence pattern that is not generated in a specified phase of the data codeword. For example, a specified bit sequence pattern is generated only in a specified phase of the codeword). The positions of the data codeword partitions are thereby identified. Scrambling is then applied to the write data as required in order to ensure accurate synchronization detection.

9 Claims, 22 Drawing Sheets

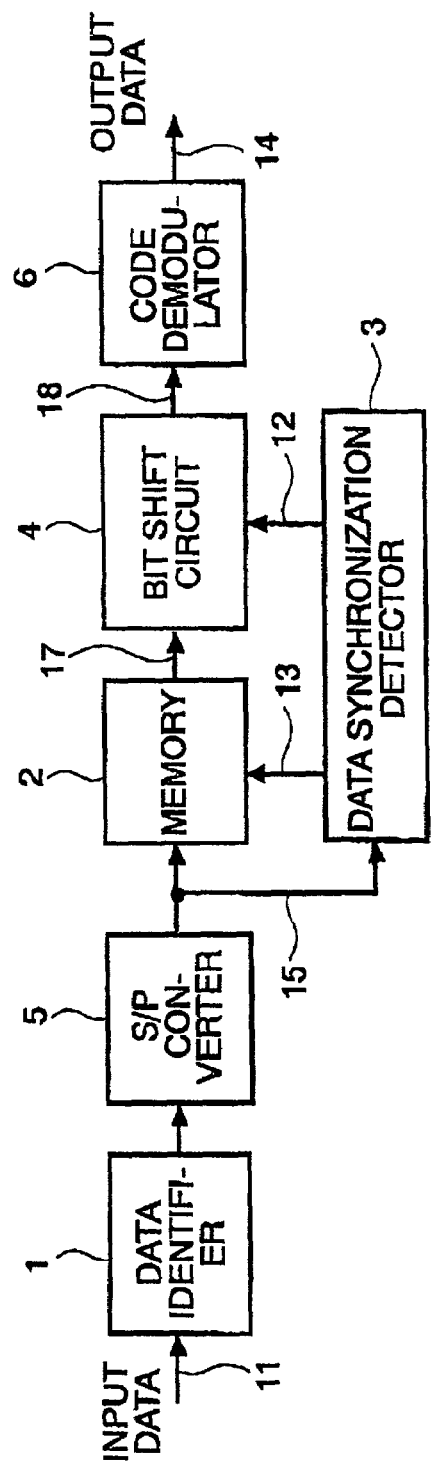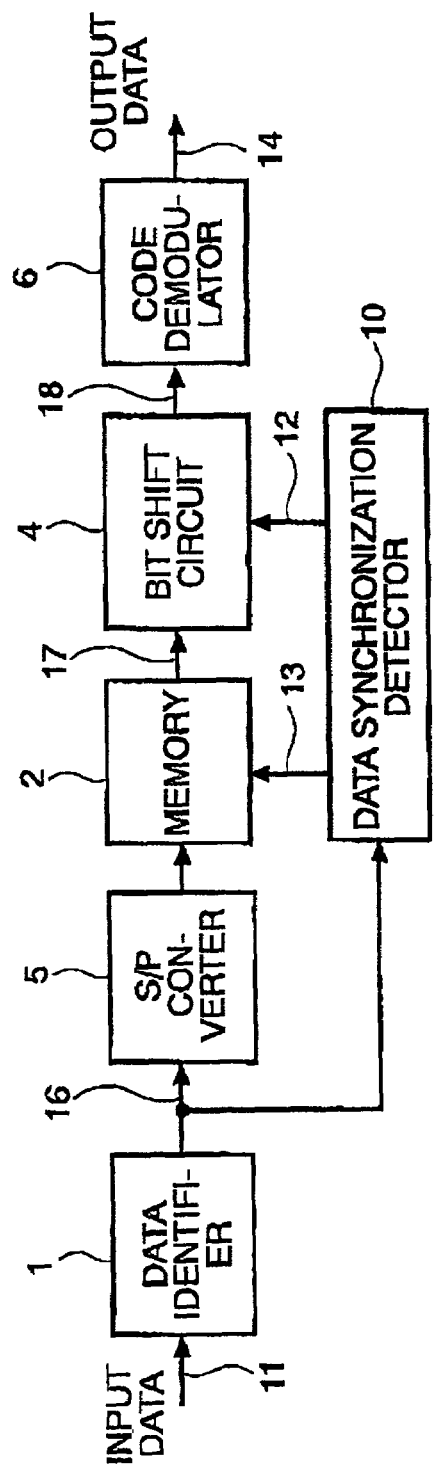

FIG.3

| No. | Code-Modulation Block (9 BITS) 1 2 3 4 5 6 7 8 9 | 1 2 3 4 5 6 7 8 9 1 | Whether or Not Pattern is Present |
|---|---|---|---|
| 1  | 0 0 0 | | NO |
| 2  |   0 0 0 | | YES |
| 3  |     0 0 0 | | YES |
| 4  |       0 0 0 | | YES |
| 5  |         0 0 0 | | YES |
| 6  |           0 0 0 | | YES |
| 7  |             0 0 0 | | NO |
| 8  |               0 0 | 0 | YES |
| 9  |                 0 | 0 0 | YES |
| 10 | 0 * 0 * 0 | | NO |
| 11 |   0 * 0 * 0 | | NO |
| 12 |     0 * 0 * 0 | | YES |
| 13 |       0 * 0 * 0 | | NO |
| 14 |         0 * 0 * 0 | | NO |
| 15 |           0 * 0 * | 0 | YES |
| 16 |             0 * 0 * 0 | | YES |
| 17 |               0 * | 0 * 0 | YES |
| 18 |                 0 | * 0 * 0 | YES |
| 19 | 1 0 0 0 0 1 | | YES |
| 20 |   1 0 0 0 0 1 | | YES |
| 21 |     1 0 0 0 0 1 | | YES |
| 22 |       1 0 0 0 0 1 | | YES |
| 23 |         1 0 0 0 0 1 | | NO |
| 24 |           1 0 0 0 0 1 | | NO |
| 25 |             1 0 0 0 | 0 1 | YES |
| 26 |               1 0 0 | 0 0 1 | NO |
| 27 |                 1 0 | 0 0 0 1 | NO |
| 28 | 1 * 0 * 0 * 0 * 0 * 1 | | NO |
| 29 |   1 * 0 * 0 * 0 * 0 * 1 | | NO |
| 30 |     1 * 0 * 0 * 0 * 0 * 1 | | NO |
| 31 |       1 * 0 * 0 * | 0 * 0 * 1 | YES |
| 32 |         1 * 0 * 0 | * 0 * 0 * 1 | YES |
| 33 |           1 * 0 * 0 * 0 * 0 * 1 | | NO |
| 34 |             1 * 0 * 0 * 0 * 0 * 1 | | NO |
| 35 |               1 * 0 * 0 * 0 * 0 * 1 | | NO |
| 36 |                 1 * 0 * 0 * 0 * 0 * 1 | | NO |

PRIOR ART

DATA SYNCHRONIZATION DETECTION METHOD, INFORMATION RECORDING METHOD, AND INFORMATION REPRODUCTION METHOD

BACKGROUND OF THE INVENTION

The present invention relates to information recording and reproduction technology and in particular relates to techniques that are effective in application to data synchronization detection etc of reproduced data in digital data recording/reproduction systems. In more detail, it relates to a data synchronization detection technique in which the information recording medium format efficiency is by improving data synchronization and detection performance without employing the conventional data synchronization signal pattern (that is "no Sync byte" or "Sync byte less"), by implementing data synchronization by means of the frequency of occurrence of a specified pattern in the reproduced data.

Conventional data synchronization detection is described below with reference to the drawings.

The conventional method is described taking a magnetic disc device as an example. FIG. 25 is an example of the recording format of a magnetic disc device. The data are recorded or reproduced in respect of the recording medium at each sector constituting a unit storage region. Each sector respectively contains a PLO_SYNC region 91 for pulling in a PLL (phase locked loop), a data synchronization signal 92 for detecting the start position of DATA 93 and obtaining a decoding timing signal of modulated code, DATA 93 of the data region in which data is actually recorded/reproduced, and, in addition, CRC or ECC 94 for error detection and/or correction. Between each sector, there is a GAP 95 constituting a pattern for correctly performing data identification of the final data bit and for absorbing the various delay times.

It is well known that accurate detection of the data synchronization signal 92 mentioned above is extremely important in subsequent code demodulation of DATA 93. That is, even if the data obtained by code demodulation in DATA 93 has an extraordinarily good number of errors, if an error is made in detection of the data synchronization signal 92, which is normally of the order of a few bytes, code demodulation of the subsequent DATA 93 amounting to a few tens to a few hundreds of bytes cannot be performed accurately. It is therefore extremely important to perform data synchronization correctly.

For example, laid-open Japanese Patent Publication No. H. 10-255400 discloses an example of the construction of data synchronization signal detection means whereby correct data synchronization can be achieved even in the event of occurrence of the adverse phenomenon know as TA (Thermal Asperity), in which waveform fluctuation occurs in the data synchronization signal 92 due to generation of heat when the reproduction head collides with the magnetic recording medium. As an example of this format, in respect of FIG. 25, an arrangement is illustrated in which a second data synchronization signal is additionally provided between the above CRC or ECC 94 and GAP 95.

Specifically, in the prior art of the above publication, in the lead channel circuit, the input data passes through an amplifier and AGC circuit before being identified by data identification means such as an automatic equalization type priority detection circuit and is then supplied to an 8/9 decoder that performs code demodulation. If, because of TA as mentioned above, the first data synchronization signal 92 cannot be correctly identified, a second data synchronization signal is detected by looking up identified data stored in the memory from GAP 95; from this, the head position of the data is found, and data reproduction is performed by outputting the identified data stored in the memory to code demodulation means such as an 8/9 decoder.

Also, the specification of U.S. Pat. No. 5,844,920 discloses a method for performing data synchronization more reliably by providing data synchronization signals at a plurality of locations.

SUMMARY OF THE INVENTION

With the conventional method, data synchronization can be more reliably performed by providing a data synchronization signal at a plurality of locations. However, the data synchronization signal is not in itself information of the user of the magnetic disc device that must be stored on the magnetic disc device. Consequently, increasing the portions where the data synchronization signal is provided lowers the so-called format efficiency, which expresses the efficiency of utilization of the recording medium by the data.

Also, as the recording density of information of the magnetic disc device increases, situations which are undesirable in regard to data synchronization may be imagined, such as instances where the probability of occurrence of TA becomes high, instances where the rate of occurrence of defects of the recording medium (portions where correct recording/reproduction of circumstances can be coped with by improving the data identification performance by improvements in signal processing of the data or by improvements in data error correction capability by using error correction code. On the other hand, in regard to the data synchronization signal, in order to maintain or improve the detection rate of the data synchronization signal, consideration may be given to increasing the regions of the data synchronization signal; however, this tends to lower the format efficiency, as mentioned above.

As described above, if there is an error in the detection of a data synchronization signal at the head of the data (it is not detected in the correct position or is detected in an erroneous position), there is the technical problem that this constitutes not merely a detection error in the data synchronization signal but also results in error in all the following several hundred bytes of code demodulation, thereby severely lowering the overall error rate.

According to a feature of the present invention, detection errors can be reduced when data synchronization detection is performed.

Also, according to a further feature of the present invention, detection performance in data synchronization is improved in correspondence with improvement in the reproduction performance of the data section, or by more than this.

In addition, according to a further feature of the present invention, the format efficiency of the information-recording medium is improved.

In addition, according to a further feature of the present invention, there can be provided a data synchronization detection device with little detection error and, furthermore, an information recording/reproduction device equipped with this.

According to the present invention, data synchronization detection is performed using the code-modulated data itself. Specifically, using a specified bit sequence pattern that is not generated in a specified phase of the data codeword, by the conversion law during code modulation (or there is a specified bit sequence pattern that is generated only in a specified phase of the codeword); the positions of the data codeword partitions are identified by counting specified bit patterns generated in the data codewords at each phase (bit).

For this purpose, according to the present invention, a format is employed constituted by PLO_SYNC, DATA, ECC and GAP as a bundled sector. There is therefore no need to employ a data synchronization signal as conventionally, and the format efficiency can also be improved. Also, data synchronization can be achieved in the same way at any time so long as the identification performance of the reproduction data can be ensured, by employing reproduced identified data.

Furthermore, in order to implement data synchronization reliably on reproduction, a specified bit sequence pattern must be included in code modulation and scrambler selection is performed in order to apply scrambling such as to enable recording of data in a condition in which data synchronization detection performance can be guaranteed.

Moreover, data position specification is also possible and for this purpose pattern correlation with the PLO_SYNC section and GAP section is detected.

BRIEF DESCRIPTION OF THE DRAWINGS

FIG. 1 is a diagram illustrating an example of the construction of a data reproduction system including data synchronization detection means according to an embodiment of the present invention;

FIG. 2 is a diagram illustrating a modified example of the construction of a data reproduction system including data synchronization detection means according to an embodiment of the present invention;

FIG. 3 is a diagram given in explanation of the principles of operation of data synchronization detection means according to an embodiment of the present invention;

DESCRIPTION OF THE PREFERRED EMBODIMENTS

An embodiment of the present invention is described in detail below with reference to drawings.

Figure 18:
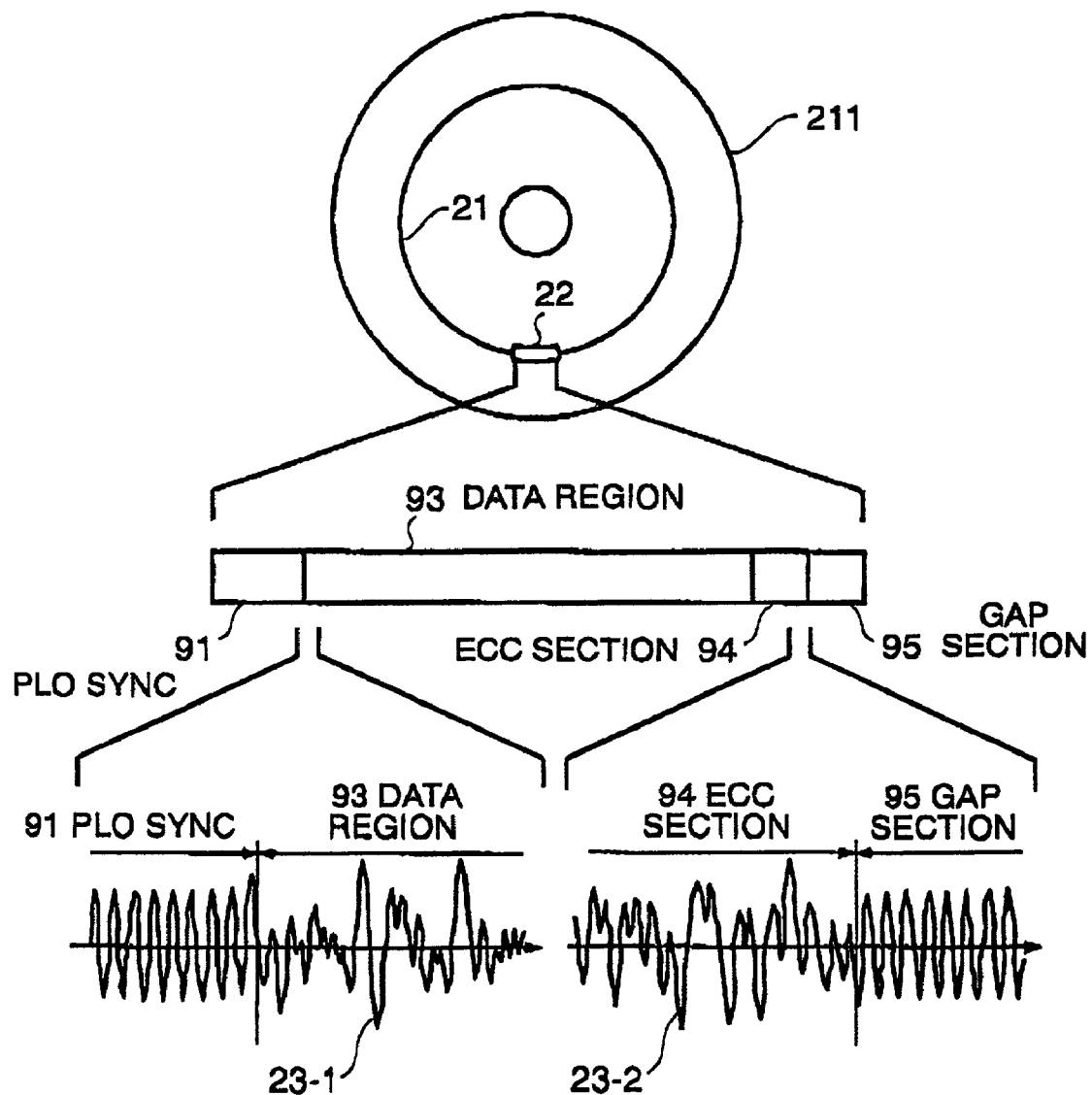
FIG. 18 is a diagram giving in explanation of an example of the data format and signal waveform on a medium corresponding to a data synchronization detection technique according to an embodiment of the present invention.

FIG. 18 is a view illustrating a format etc according to the present invention. On magnetic disc 211 on which the information is recorded, there are provided concentric circular tracks 21; in tracks 21 there are sectors 22 constituting the information storage/reproduction units. A sector 22 comprises PLO_SYNC 91, DATA 93, ECC 94 and GAP 95. In this case, the conventional data synchronization signal is absent, and PLO_SYNC 91 and DATA 93 are adjacent. The bottom portion of this Figure illustrates an example of the data reproduction waveform form the reproduction head. This is the reproduction waveform 23-1 of the front portion of sector 22 from PLO_SYNC 91 to DATA 93 and the reproduction waveform 23-2 of the rear portion of sector 22 from ECC 94 to GAP 95. Although, to facilitate understanding, the reproduction waveform 23-2 which is here illustrated is a PLO_SYNC form waveform in GAP 95 to which no scrambling has been applied, any desired waveform, to which scrambling has been applied, could be employed.

FIG. 1 shows an example of the construction of a data synchronization detection device employed in an information recording and reproduction device of a format of this form, in which a data synchronization signal is not used. The input data 11 is input to data identification means 1. Data identification means 1 performs data identification of input data 11 and inputs the data identification output to serial/parallel conversion means 5. Serial/parallel conversion means 5 outputs the data identification output with a bit width matching the code modulation bit width, and respectively inputs this to memory 2 and data synchronization detection means 3. The reproduced identified data corresponding to PLO_SYNC 91, DATA 93, ECC 94, and GAP 95 are successively held in memory 2.

In this embodiment, data synchronization detection means 3 detects the number of occurrences of a specified bit sequence pattern at each position, and from this result detects the code-modulated codeword divisions of the reproduced data, and outputs this as data phase detection output 12. It also finds the correlation between the PLO_SYNC pattern of the front part of the identified data and the GAP pattern of the rear part of the identified data and thereby detects the position of the codeword for which these patterns best coincide, and outputs this as the data position detection output 13.

Memory 2 inputs the data position detection output 13 from data synchronization detection means 3; the identified data held in memory 2 is output from the position corresponding to the data starting position and is then input to bit shift circuit 4.

Bit shift circuit 4 outputs identified data in codeword units by performing bit shift such as to match the codeword divisions by data phase detection output 12 supplied from data synchronization detection means 3, and inputs these to code demodulating means 6. Code demodulating means 6 performs code demodulation corresponding to the code modulation performed during information recording, and outputs the result as output data 14.

In order to explain these actions, whether or not a specified bit sequence pattern is generated at each phase in the demodulation codeword will be described using FIG. 3. This will be described taking as an example the 8/9 (0, 4/4) conversion, in which 8-bit data is converted to a 9-bit codeword as disclosed in U.S. Pat. No. 4,707,681. In the uppermost part of FIG. 3, numbers 1 to 9 indicating the bit width of codewords are set out. The codeword divisions are before 1 and between 1 and 9. No. 1 to No. 9 represent the conditions of each posse in the codeword in regard to bit sequence patterns in which there are three consecutive zero bits. That is, the nine phases are respectively indicated such that No. 1 represents the case where the position of the first 0 in a pattern with three consecutive zero bits is at the phase of codeword 1 and No. 2 represents the case where the position of the first 0 in a pattern with three consecutive zero bits is at the phase of codeword 2. Since in these codewords a succession of four zero bits is permitted, it would in principle be expected that no problems would be caused by generation of bit sequence patterns of three consecutive zero bits at any location. However, in the construction of these codewords, the number of consecutive zero bits at the terminal portions of the codewords is restricted to no more than two bits. Consequently, at the position of No. 1 where three zero bits are represented at the front codeword terminal, and at the position of No. 7, where three zero bits are represented at the rear codeword terminal, patterns of three consecutive zero bits cannot be generated. Whether or not three consecutive zero bits can be generated in this way is indicated for each phase in the right-hand column.

Likewise, in the case of No. 10 to No. 18, the condition of each phase in the codewords is indicated in respect of bit sequence patterns in which there are three consecutive zero bits at a one-bit interval. In this case, * represents any bit i.e. the bit can be either 0 or 1. That is, No. 10 illustrates the case where the position of the first 0 in the pattern mere there are three consecutive zero bits at a one-bit interval is at phase 1 of the codeword and No. 11 illustrates the case where the position of the first 0 in the pattern where there are three consecutive zero bits at a one-bit interval is at phase 2 of the codeword; these are respectively shown for the nine phases. Since this codeword permits four consecutive alternate bits to be 0, in principle, it would be expected that bit sequence patterns in which three consecutive alternate bits are 0 should be allowed to occur at any location. However, in the codeword construction, the number of alternate bits which can be consecutively 0 is restricted to not more than two bits at the codeword terminals. Thus, at the positions of No. 10 and No. 11, which represent cases where three consecutive alternate bits are 0 at the front terminal portion of the codeword, and at the positions of No. 13 and No. 14, which represent cases where three consecutive alternate bits are 0 at the rear terminal portion of the codeword, patterns in which three alternate bits are consecutively 0 cannot be generated. Whether or not three alternate bits which are 0 can be consecutively generated in this way is indicated for each phase in the right-hand column.

Likewise, at No. 19 to No. 27, the conditions of each phase in the codewords for bit sequence patterns in which there are four successive zero bits are indicated. Since only four bits can be consecutively 0, the bits at both ends will always be 1, so these are represented as '100001'. That is, No. 19 illustrates the case where the position of the first 1 in the pattern '100001' is at phase 1 of the codeword and No. 20 illustrates the case where the position of the first 1 in the pattern '100001' is at phase 2 of the codeword; these are respectively show for the nine phases. Since in these codewords a succession of four zero bits is permitted, it would in principle be expected that no problems would be caused by generation of bit sequence patterns of four consecutive zero bits at any location. However, in the construction of these codewords, the number of consecutive zero bits at the terminal portions of the codewords is restricted to no more than two bits. Consequently, at the position of No. 26 where three consecutive zero bits are represented at the front codeword terminal, and at the position of No. 27, where four consecutive zero bits are represented at the front codeword terminal, and at the position of No. 24, where three consecutive zero bits are represented at the rear codeword terminal, and at the position of No. 23, where four consecutive zero bits are represented at the rear codeword terminal, patterns of four consecutive zero bits cannot be generated. Whether or not four consecutive zero bits can be generated in this way is indicted for each phase in the right-hand column.

Finally, at No. 28 to No. 36, the conditions of each phase in the codewords for bit sequence patterns in which four alternate bits are successively 0 are indicated. Since only four alternate bits can be consecutively 0, the bits at both ends will always be 1, so these are represented as '1*0*0*0*0*1'. That is, No. 28 illustrates the case where the position of the first 1 in the pattern '1*0*0*0*0*1' is at phase 1 of the codeword and No. 29 illustrates the case where the position of the first 1 in the pattern '1*0*0*0*0*1' is at phase 2 of the codeword; these are respectively shown for the nine phases. Since in these codewords a succession of four alternate zero bits is permitted, it would in principle be expected that no problems would be caused by generation of bit sequence patterns of four alternate zero bits consecutively at any location. However, in the construction of these codewords, the number of consecutive alternate zero bits at the terminal portions of the codewords is restricted to no more than two bits. Consequently, at the positions of No. 33 and No. 34 where three alternate zero bits are consecutively represented at the front codeword terminal, and at the positions of No. 35 and No. 36, Where four alternate zero bits are consecutively represented at the front codeword terminal, and at the positions of No. 29 and No. 30, were three consecutive zero bits are represented at the rear codeword terminal, and at the position of No. 28 (No. 36 is common with the front codeword terminal), where four alternate zero bits are consecutively represented at the rear codeword terminal, patterns of four alternate zero bits cannot be consecutively generated. Whether or not four alternate zero bits can be consecutively generated in this way is indicated for each phase in the right-hand column.

Thus, in the case of 8/9 (0, 4/4) conversion, it can be seen that there are positions where the four patterns '000', '100001', '0*0*0', and '1*0*0*0*0*1' cannot be generated.

Although hereinabove 8/9 (0, 4/4) conversion was taken as an example, the same situation arises in the case of other code conversions. Also, this is not restricted to cases where the coding factor is 8/9 but applies likewise to 16/17 conversion or 32/33 conversion or 64/65 conversion code modulation. Alternatively, code modulation can also be achieved choosing special patterns and positions where only specific phases are generated, such as to be applied to pattern synchronization detection according to the present invention. For example, regarding the No. 4 pattern and phase, only four such are present in 256 codewords, but, by changing the selection of codewords employed, this can be increased to eight.

Next, the data synchronization detection action during information recording will be described using FIG. 4. An example in which data synchronization is performed using a pattern in which three alternate bits which are 0 are consecutively generated for 8/9 (0, 4/4) conversion will be described. No. 1 to No. 9 indicate respective bit sequence patterns in a modulation codeword sequence corresponding to No. 17, No. 18, and No. 10 to No. 16 of FIG. 3. Just as in the case for FIG. 3, numerals 1 to 9 represent the bit widths of the codewords, and the codeword division is taken between 1 and 9. Also, represents any bit i.e. the bit can be either 0 or 1.

In the following sequence, the number of occurrences of the '0*0*0' bit sequence pattern in each modulation codeword phase during recording of information is represented by numerical values and a histogram. As shown, No. 1 to No. 9 have respective values 20, 37, 0, 0, 24, 0, 0, 25 and 20. In this case, the bit pattern '0*0*0' is not generated at the No. 3, No. 4, No. 6 and No. 7 positions. Since the division positions of the modulation codewords on recording are known, the positions where their values are 0 are fixed. In this condition threshold values are provided for the positions where the values are other than 0, that is for the values of No. 1, No. 2, No. 5, No. 8 and No. 9, these being determined such that data synchronization detection on reproduction can be achieved. The threshold values are values for deciding the number of occurrences of the pattern in each phase, and are found statistically: they can be set to values that may be chosen at will or can also be altered as parameters; the decision conditions may be strictly set or may be loosely set. For example, if a threshold value of 12 is set, there are only the four locations i.e. the 0 portions, where this threshold value is not exceeded, the minimum value of all the other locations being 20; thus the threshold value is exceeded by at least 8 in all these cases, so that a sufficient margin for use is provided. However, if the threshold condition is set strictly at 21 or more, there are then a total of six locations in which the threshold value is not exceeded, namely, the four zero portions and the locations No. 1 and No. 9 where the value is 20; the margin for data synchronization detection on reproduction therefore becomes small and it is therefore not possible to use such a setting for recording. As win be described later, such a situation can be overcome by altering the scrambler. If the threshold value set is excessively strict, the number of scrambler candidates on recording will be increased; if the value set is excessively loose, performance on data synchronization detection during reproduction will be adversely affected; it should therefore be variable in an appropriate range of values.

The threshold value that is set depends on the number of allowed errors on reproduction; as a practical value, about 5 to 10 is satisfactory. There is a risk of data synchronization detection becoming impossible when errors occur, either such that the number of detections at the position where the error occurs is decreased due to the occurrence of an error at the position where this bit sequence pattern is present, or such that occurrence of an error makes the bit sequence pattern appear at a position where this bit sequence pattern was not generated. This may happen either when 5 to 10 such errors are generated concentrated in at least a single phase or when the total of the number of errors generated in positions we this bit sequence pattern was present and the number of errors generated in positions where this bit pattern was not present is 5 to 10. Considering the average case, this means that a few tens of errors are generated in respect of this bit sequence pattern; also, considering that errors are also generated that have no connection with the input sequence pattern (i.e. are not connected with errors involving either generation or loss of the bit sequence pattern '0*0*0'), a number of errors greater than this will be generated. The excellence of the data synchronization detection performance obtained with the present invention can thereby be appreciated.

Figure 4:
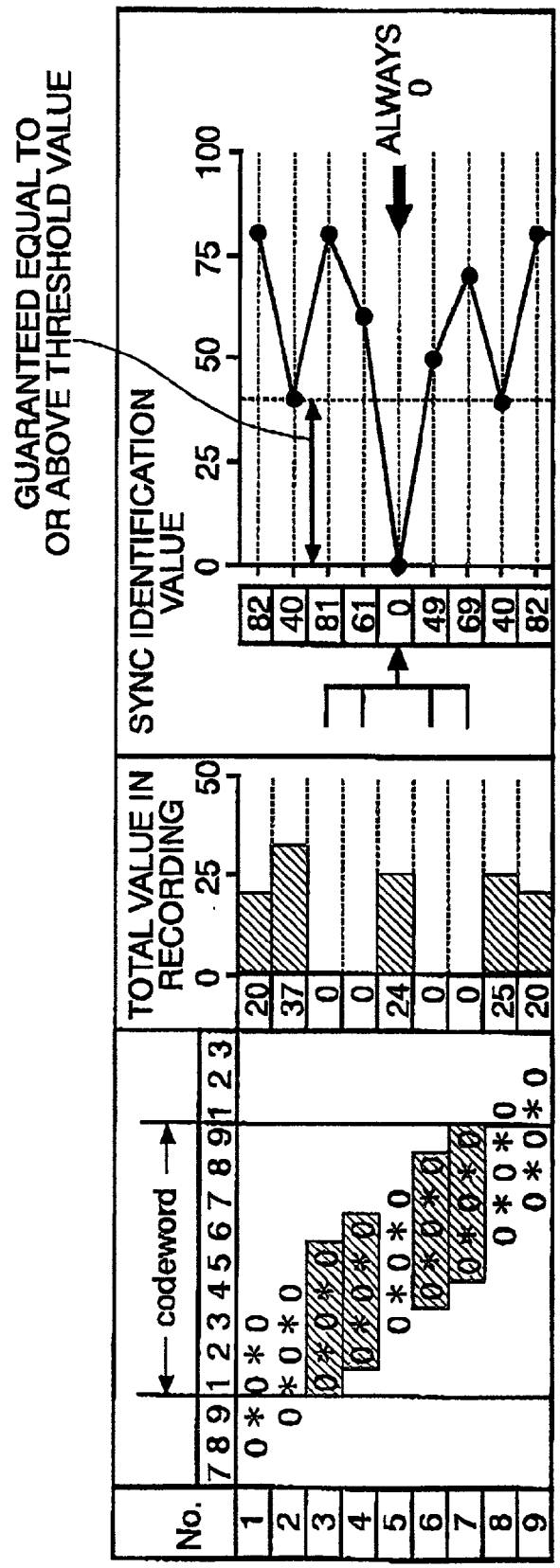
FIG. 4 is a diagram given in explanation of the action of preparatory processing on recording corresponding to data synchronization detection means according to an embodiment of the present invention.

The values in the right-hand column of FIG. 4 are obtained by arithmetical processing of total values of the bit sequence pattern on recording; in this way, determination of the threshold value is simplified, and better performance is ensured. Specifically, in the method of determination which is illustrated, the values are generated by adding up the number of occurrences of the bit sequence pattern at four phases, the locations which are zero being counted at a single location, so that the minimum values other than zero are at or above the threshold value. This will now be described in detail. Since the values of No. 3, No. 4, No. 6, and No. 7 shown in FIG. 4 are zero, their sun is also zero and this is entered in the position of No. 5. Next, the sun of the values of No. 4, No. 5, No. 7 and No. 8 is 49, and this is entered at the position of No. 6. As a result of performing this processing nine times, the respective values 82, 40, 81, 61, 0, 49, 69, 40 and 82 are entered at No. 1 to No. 9. The No. 5 position is always zero, so the minimum values other than this may be compared with the threshold value. In fact, it is sufficient to compare the threshold value and the values of the positions other than No. 5.

Let us now consider the situation when 40 is obtained for the minimum value at the positions other than No. 5. This may be understood as expressing the fact that the range of setting the threshold value can be made wider than in the case described above. Also, cases where the result of the determination is that [the medium] is no longer usable (number of times that scrambler selection is repeated on data recording, taking into account ease of data synchronization detection on reproduction) also decrease.

In this way, a method of determination whereby performance can be further improved may be applied by first of all finding the values of the number of occurrences of the bit sequence pattern (number present) in the respective phases, then performing a calculation utilizing these. Various applications are therefore also possible apart from the method described herein. For example, it would also be possible to find for each of the nine phases, by a similar combination, the total of the locations of the phases where the bit sequence patterns of No. 1, No. 2, No. 5, No. 8, and No. 9 are present, and to detect modulation codeword division by the maximum value thereof. In addition, a method is also possible in which the difference of the sum of No. 1, No. 2, No. 5, No. 8 and No. 9 and the sum of No. 3, No. 4, No. 6, and No. 7 is found for each of the nine phases by a similar combination, and modulation cod division detected form the location of maximum difference.

Next the data synchronization detection action in the case of reproduction of recorded information will be described using FIG. 5. In this case also, in the same way as in FIG. 4, an example of data synchronization is described using a pattern '0*0*0' (where * indicates any bit i.e. 0 or 1) of three alternative bits which are consecutively zero for 8/9 (0, 4/4) conversion.

The first column of No. 1 to No. 9 shows the nine phases of the patterns of three alternate bits witch are consecutively zero when performing data synchronization detection. Since this is reproduction, the correct modulation codeword divisions cannot be ascertained until data synchronization detection can be achieved. That is, only the bit width phase corresponding to the modulation codewords when an identified reproduced data bit sequence is input is displayed. The numerals 1 to 9 indicating the bit width of the modulation codewords are listed; the interval between 1 and 9 constitutes the partition of the modulation codewords during input.

The next column indicates the number of occurrences of '0*0*0' bit sequence patterns and the phase of each modulation codeword on reproduction of information, as the value thereof and a histogram. This shows that No. 1 to No. 9 respectively have values: 16, 11, 11, 28, 9, 9, 15, 9 and 9. Data synchronization detection may be performed by analyzing this histogram and specifying the phase of the modulation codeword. However, in this example, data synchronization detection is difficult to perform using a threshold value. That is, if 9 is chosen as the threshold value, the locations that do not exceed 9 are: No. 5, No. 6, No. 8 and No. 9, and the position No. 7 can be identified as being the middle bit of the codeword. Likewise, if 10 is chosen as the threshold value, the locations that do not exceed 10 are No. 5, No. 6, No. 8 and No. 9, and the position of No. 7 can be identified as being the middle bit of the codeword. However, if 11 is selected as the threshold value, the locations that do not exceed 11 are No. 2, No. 3, No. 5, No. 6, No. 8 and No. 9, and the partition of the codeword cannot be identified. Likewise, if 8 is chosen as the threshold value, there are no locations that do not exceed 8, so the partition of the codeword cannot be identified.

Accordingly, in the following example, the sum of the values at four locations is taken, in the same way as when recording. The sum of No. 1, No. 2, No. 4, and No. 5 is 64, and this is entered at the location of No. 3. The sum of No. 2, No. 3, No. 5, and No. 6 is 40, and this is entered at No. 4. Repeating this process 9 times, for No. 1 to No. 9, the respective values 40, 64, 64, 40, 63, 61, 36, 49 and 51 are obtained. The minimum of these is No. 7, which is 36; the modulation codeword partition can therefore be specified using this. In the case of FIG. 4, the minimum value corresponds to the middle bit of the 9-bit modulation codeword; if the same procedure is adopted in this case, No. 7 becomes the middle bit of the modulation codeword; thus the partition of the modulation codeword should be between 4 and 5 of the bit width phase corresponding to the length of the modulation codeword when inputting the initial bit sequence. In this connection a minimum value is sought: the requirements for this are that it should be a single smallest value, the difference between this and the next smallest value being at least 1.

As an example of the case of such reproduction, let us assume that recording was performed in accordance with FIG. 4 and that, on reproduction, nine errors occur in the pattern relating to all of the phases, these being such as to adversely affect the detection condition (i.e. such that [the condition] is generated where it ought not to be generated and is lost were it ought to appear). That is, this is a situation in which 45 errors have been generated. It is found that even in these circumstances, it is possible to correctly detect the partition position of the modulation codewords and to obtain good detection performance.

In this way, even on reproduction, it is possible to apply a method of identification whereby performance can be further improved, by first of all finding the values of the number of occurrences of the bit sequence pattern in the respective phases and then performing calculation utilizing these. Various applications other than the method described up to this point are therefore possible. For example, a method is also possible in which the sum of the bit sequence patterns of No. 1, No. 2, No. 5, No. 8 , and No. 9 present at the locations are found by the same kind of combination for the nine phases and the partitions of the modulation codewords detected by the maximum value thereof. Furthermore, a method is also possible in which the difference of the sum of No. 1, No. 2, No. 5, No. 8 and No. 9 and the sum of No. 3, No. 4, No. 6, and No. 7 is found for the nine phases by the same combination, and the partitions of the modulated codewords are detected from the locations where the difference is an maximum.

Figure 5:
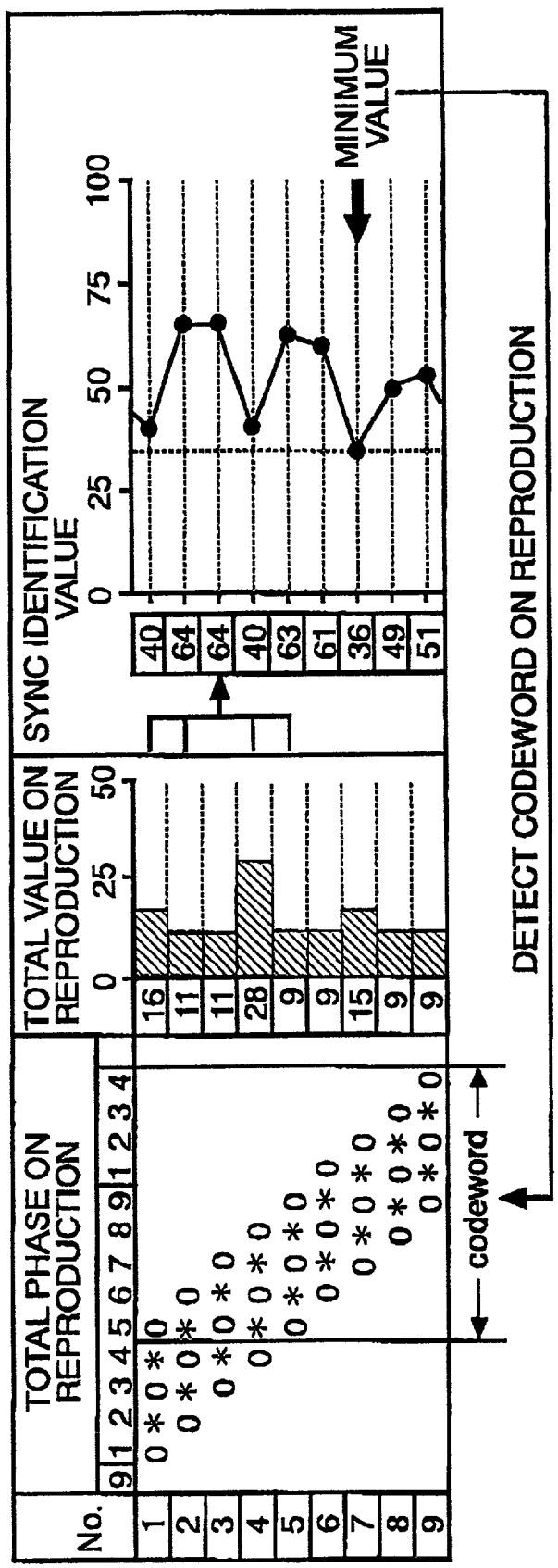
FIG. 5 is a diagram given in explanation of an example of the action of synchronization detection on reproduction of data synchronization detection means according to an embodiment of the present invention.

Furthermore, although, in FIG. 4 and FIG. 5, the description of an 8 /9 (0, 4/4) conversion was given using the pattern '0*0*0' (* indicates an arbitrary bit i.e. 0 or 1) in which three alternate zero bits are consecutive, as show in FIG. 3, apart from this, three other types of bit sequence pattern can also be employed for 8/9 (0, 4/4) conversion and it would also be possible to employ respective bit sequence patterns; alternatively, a plurality of patterns could be used in combination. Of course, if the bit sequence patterns employed are increased, the scale of the calculation circuitry increases, but it is also possible to improve detection performance.

Next, a data position detection method will be described using FIG. 6. The row at the top indicates the output of an ML (maximum priority decoding means) which is the output of data identification. Since at this point the partition position of the modulation codeword is not known, the partition of PLO_SYNC 91 and DATA 93 and the partition of the modulation codeword do not coincide. Of course, in fact, the partition of PLO_SYNC 91 and DATA 93 is also in an unknown condition. This ML output is subjected to phase detection for data synchronization detection to detect the partition of the modulation codeword. When this is done, the partition position of the modulation codeword is ascertained, and also coincides with the partition of PLO_SYNC 91 and DATA 93. The assumed data sequence that is output from the bit shift circuit in such a condition is the bit shift output. In fact, after data position detection has been performed, only the data section is output from the bit shift circuit, so, at this point, it may be assumed that output is obtained from PLO_SYNC 91 up to GAP 95.

In order to perform data position detection, the PLO_SYNC 91 pattern (known pattern employed when writing) and the bit sequence pattern of the bit shift output, and pattern of GAP 95 (known pattern employed when writing) and the bit sequence pattern of the bit shift output are respectively subjected to pattern comparison. This case is an example in which comparison is effected of amounts corresponding respectively to three codewords. Seven phases were data position detection is performed are illustrated; the way in which this is done is illustrated at No. 1 to No. 7. The positions where pattern comparison is effected are positions remote from DATA 93 and ECC 94. The number of bits that coincide in the respective pattern comparisons is indicated in the right-hand border. These numbers are respectively 47, 49, 51, 54, 49, 47 and 46 for No. 1 to No. 7. Data position detection is performed using the max position of the number of bits that coincide obtained by these pattern comparison results. In this case, this is therefore position No. 4.

In the example of the format of FIG. 18, in order to facilitate understanding, the pattern of GAP 95 is taken as being the same pattern as PLO_SYNC 91, but, so long as the bit sequence pattern that is written is known, it could be any pattern.

Also, although the method could be adopted of comparing each bit in regard to the ML output, if this is done, due to the condition of the DATA bit sequence pattern, identification is difficult to achieve even in the vicinity of the correct position. Accordingly, detection accuracy can be ensured by employing the position detection output for data synchronization detection.

In this case, in conformity with the embodiment described above, in the example of a 9-bit codeword, in the identified data that is stored in memory, it is assumed that sufficient amounts (a plurality of codewords) are stored in regard to the PLO_SYNC 91 and GAP 95 portions; data position detection for data synchronization detection is necessary. However, for example where, as in 64/65 conversion, the modulation codeword is long, in the case of an arrangement in which the causes of fluctuation of timing with which identified data are stored in memory (for example fluctuation of the speed of the motor that rotates the magnetic disc or fluctuation of the gate signal for reproducing the data) can be restrained to fluctuations shorter than 65 bits, the data position becomes self-evident from the results of phase detection of the data synchronization detection, so this is unnecessary.

Figure 6:
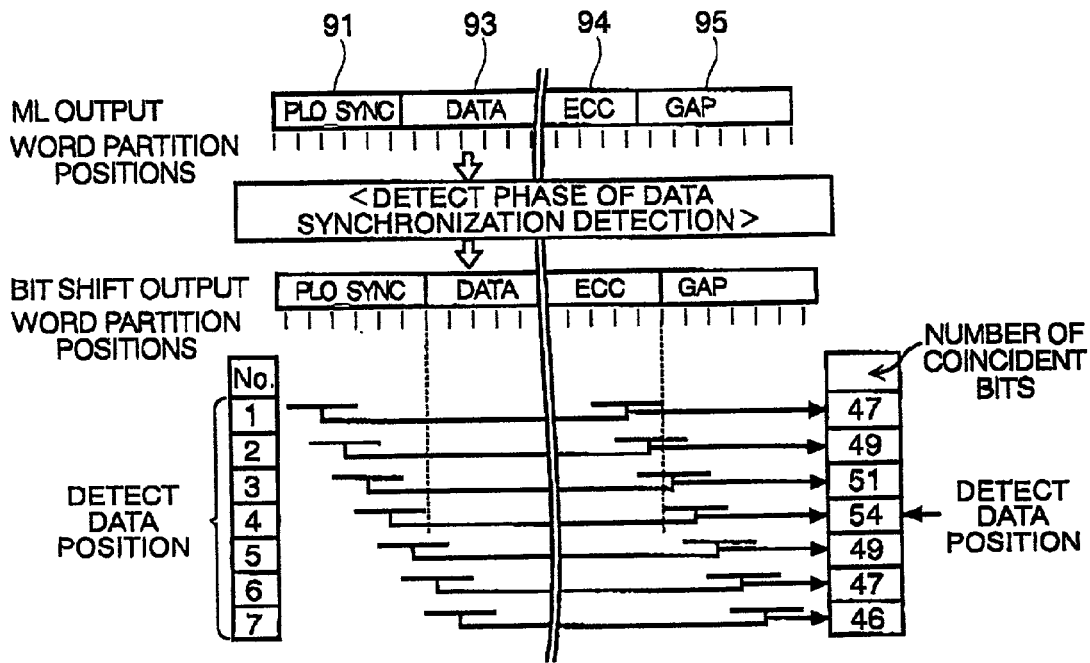
FIG. 6 is a diagram in given in explanation of a example of a method of data position detection during reproduction of data synchronization detection means according to an embodiment of the present invention.
Figure 7:
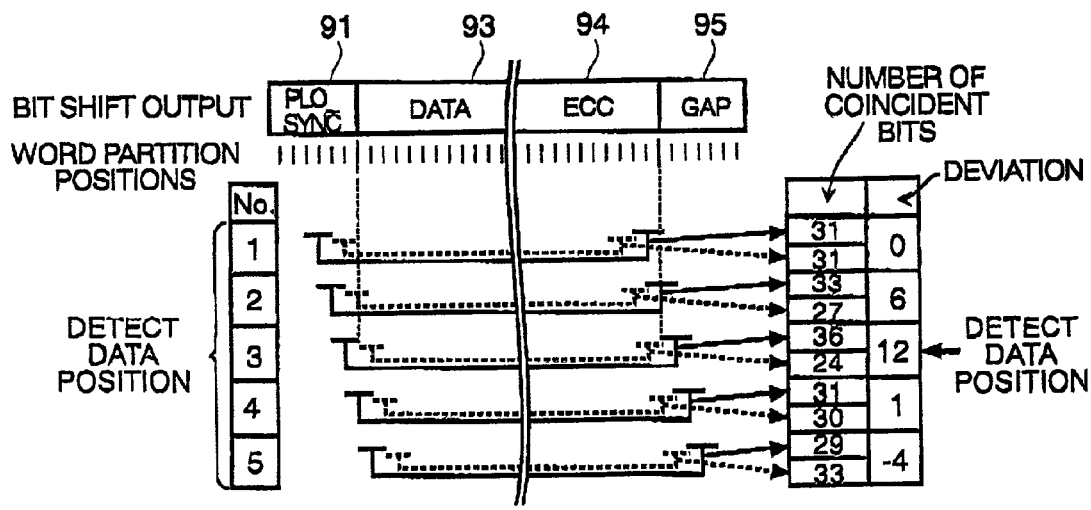
FIG. 7 is a diagram given in explanation of a modified example of a method of data position detection on reproduction of data synchronization detection means according to an embodiment of the present invention.

FIG. 7 shows another data position detection method. In this case, for data position detection, apart from respective pattern comparison of the pattern of PLO_SYNC 91 with the bit sequence pattern of the bit shift output as well as the pattern of GAP 95 with the bit sequence pattern of the bit shift output, pattern comparison is also performed in respect of the DATA 93 and ECC 94 portions which are immediately on the inside of these, using the same pattern as for outside. That is, the bit sequence pattern of the bit shift output of the portion corresponding to DATA 93 is cared with the PLO_SYNC pattern and the bit sequence pattern of the bit shift output of the portion corresponding to ECC 94 is compared with the GAP pattern. These correspond to the portions indicated by broken lines in the Figure. In this case, this will be assumed to be the GAP pattern, which is of PLO_SYNC pattern form, indicated in FIG. 18. The number of coinciding bits for the portion outside DATA which has been subjected to pattern comparison and the portion inside this are found, and the difference of these is found. Detection accuracy can be increased compared with the case of the example illustrated in FIG. 6 previously, by data position detection using the position at which this difference is a maximum. In this example, data position detection was achieved at the position of No. 3, where the difference is 12.

That is, this is because the difference of the result of the determination of the solid line portion of FIG. 7 in which a comparison of the number of coincident bits is performed between the known PLO_SYNC 91 and GAP 95 at the interval of the length of DATA 93 and ECC 94 and the result of the determination of the broken line portion, in which a comparison of the number of coincident bits between the known PLO_SYNC 91 and GAP 95 is likewise performed immediately on the inside thereof is a maximum when the comparison position of the outside, solid line portion coincides with the boundary portion of PLO_SYNC 91 and DATA 93 i.e. at the point where the true data position has been detected.

Figure 8:
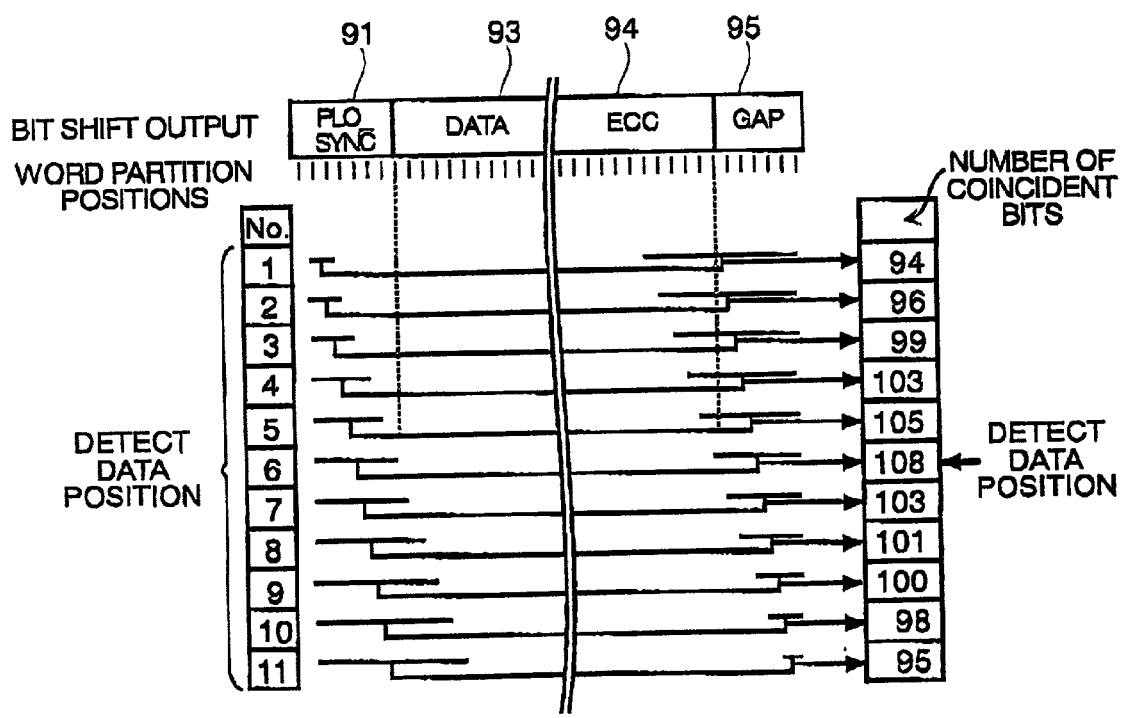
FIG. 8 is a diagram given in explanation of a modified example of the data position detection method on reproduction of data synchronization detection means according to an embodiment of the present invention.

FIG. 8 shows yet another method of data position detection. In this case, detection is performed using all of the portions outside the DATA 93 and ECC 94 portions for data position detection. In this case, caution is required, since detection performance is lowered if, as the reproduction waveform in the identified data of GAP 95 stored in memory, identified data of a discontinuous portion (reproduction waveform of a write portion which is actually discontinuous) are stored. In this case, detection performance can be raised by employing the usable portion of the PLO_SYNC pattern and GAP pattern to the maximum limit. In this example, since the value of a maximum value of 108 is indicated at position No. 6, data position detection is performed at this position.

Also, in the same way as in FIG. 7, pattern comparison can be performed also for the DATA 93 and ECC 94 portions which are immediately on the inside of the PLO_SYNC pattern and GAP pattern. This case also is a situation in which the bit sequence pattern of the bit shift output of the portion corresponding to DATA 93 and the PLO_SYNC pattern are compared, and the bit sequence pattern of the bit shift output of the portion corresponding to ECC 94 and the GAP pattern are The difference between the comparison result of the PLO_SYNC pattern and the GAP pattern and the comparison results in respect of the DATA 93 and ECC 94 portions may then be found, and the location at which this is a maximum used for data position detection.

Figure 9:
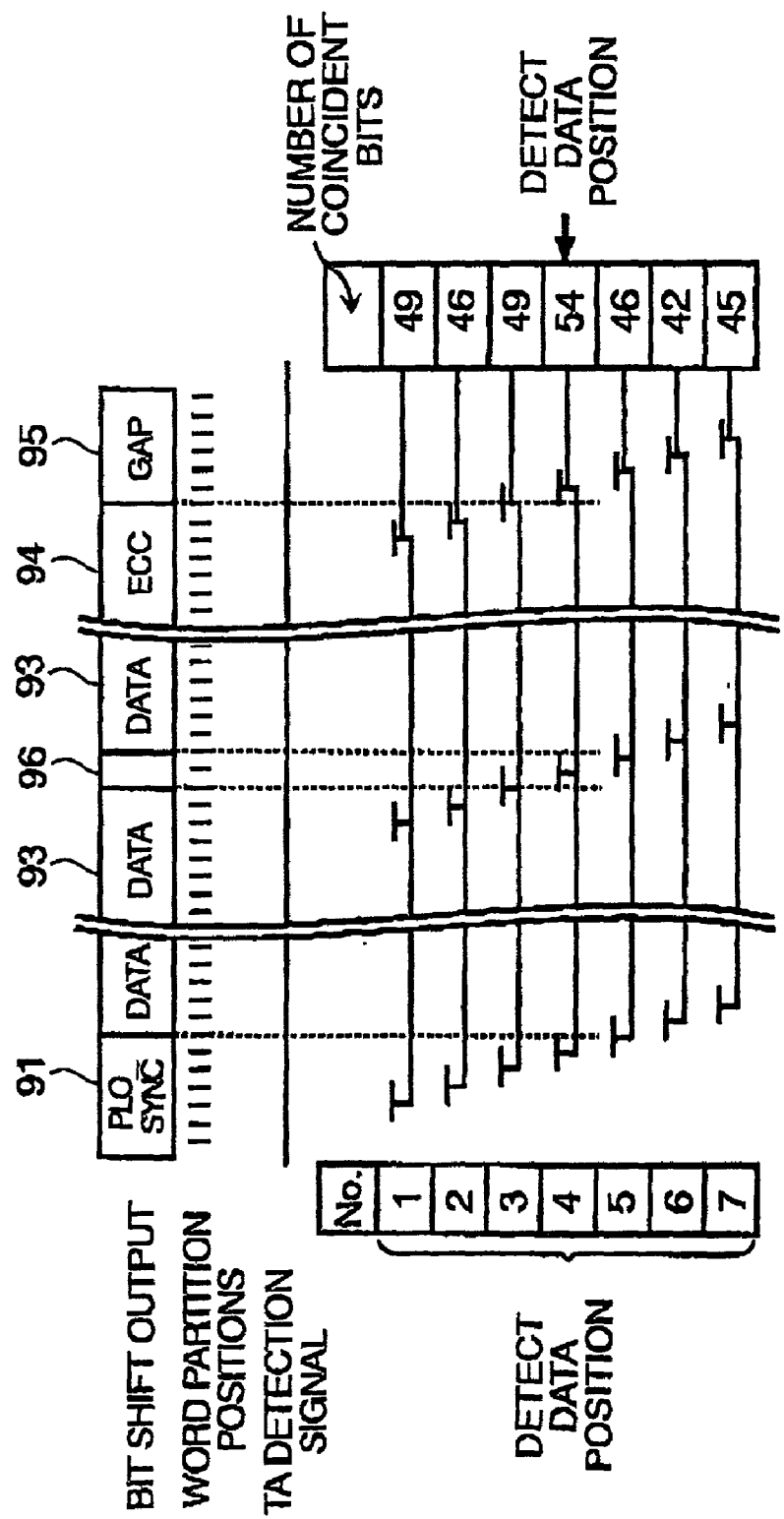
FIG. 9 is a diagram given in explanation of a modified example of the data position detection method on reproduction of data synchronization detection means according to an embodiment of the present invention.

FIG. 9 shows yet another data position detection method. In this case, PLO_SYNC 96 is provided at some position in DATA 93 as a data position detection pattern for data position detection, and data position detection is performed by data comparison of three locations. In order to facilitate understanding, the data position detection pattern is assumed to be the same pattern as in the case of PLO_SYNC 91, but, so long as the written bit sequence pattern is known, any type of pattern could be employed. This may be a pattern such as is not generated in code modulation. In this example, the value of maximum value 54 is indicated at position No. 4, so data position detection is performed at this position. Further improvements may be made in this case, using the same concepts as in FIG. 7.

Figure 10:
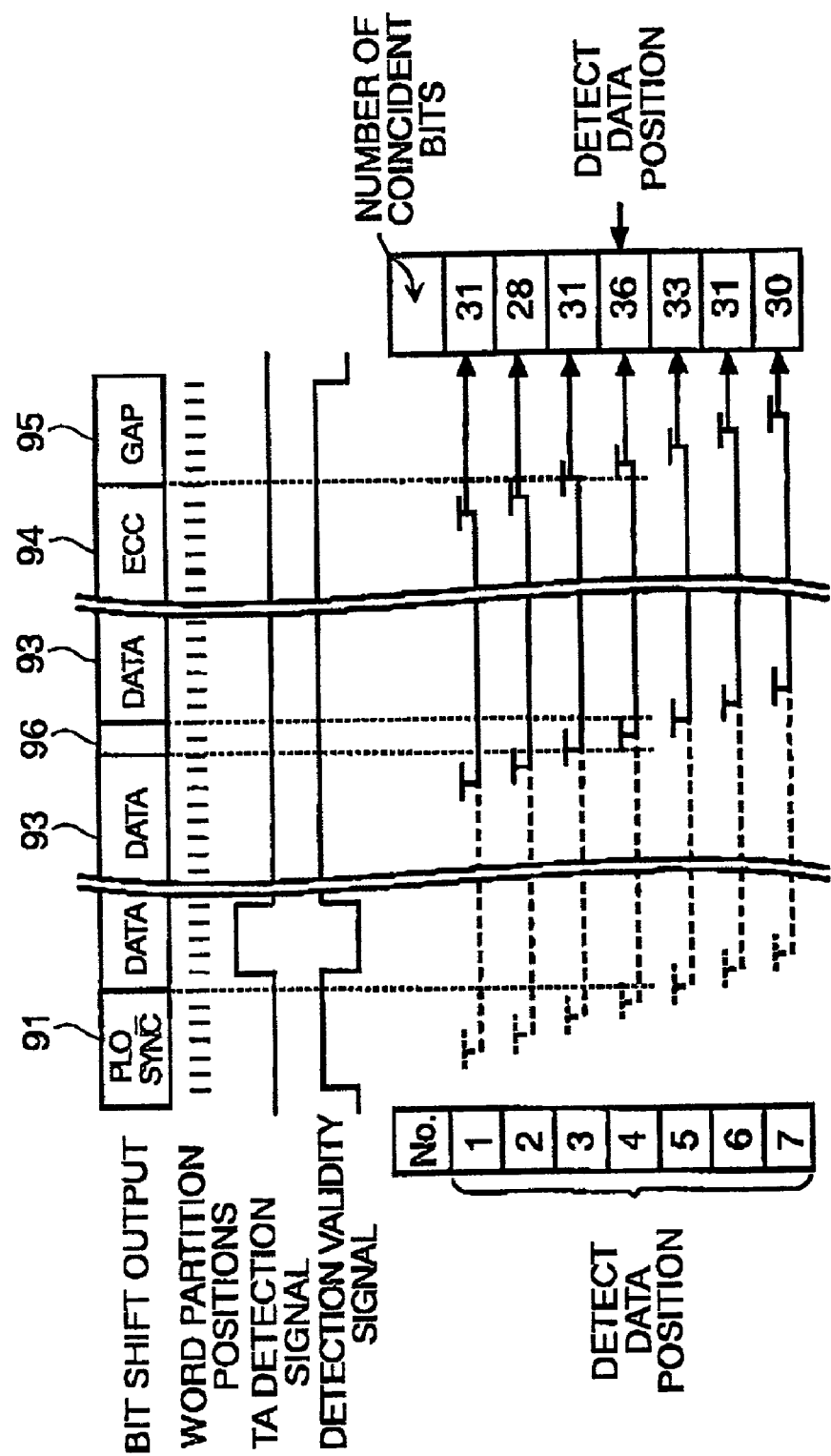
FIG. 10 is a diagram given in explanation of a modified example of a method of data position detection on TA detection during reproduction of the data synchronization detection means according to an embodiment of the present invention.

FIG. 10 shows a data position detection method in the case here TA occurs in front of the sector, in the case of the construction of FIG. 9. Although TA has been referred to here, apart from TA, this could be any signal lowering the detection quality of the reproduction waveform, or could be the quality of the decision information when effecting data identification. The fact that TA has occurred in front of the sector is identified by means of the TA detection signal; its position is within the range of pattern comparison with the PLO_SYNC pattern for data position detection, so data position detection is performed by pattern comparison of the PLO_SYNC 96 portion in DATA 93 and pattern comparison of GAP 95, instead of performing pattern comparison with the PLO_SYNC pattern in the header (shown by the broken line in the Figure). That is, in order to perform data position detection, pattern comparison is effected at two locations of the three pattern comparison locations. In this example, a value of the maximum value of 36 is indicated at position No. 4, so data position detection is performed at this position. In this case also, further improvements may be added, using the same concept as FIG. 7.

Also, in regard to the examples of FIG. 6 to FIG. 8 described above, if lowering of quality of the reproduction waveform, due for example to TA, is observed at either of the two locations, data position detection may be performed at either remaining location. Specifically, this is because, since the length of DATA 93 and ECC 94 when writing is known, the end position can be reduced from the position of the header side, which has been established (result of comparison of the PLO_SYNC pattern); contrariwise, the header can be also be deduced from the end position (result of comparison of the GAP pattern).

Furthermore, in regard to the point where TA has occurred, it may be expected that data identification results will be produced departing from the recorded data. Consequently, data phase detection performance can be ensured by arranging that such portions are not employed as identified data for data phase detection in data synchronization detection.

Figure 11:
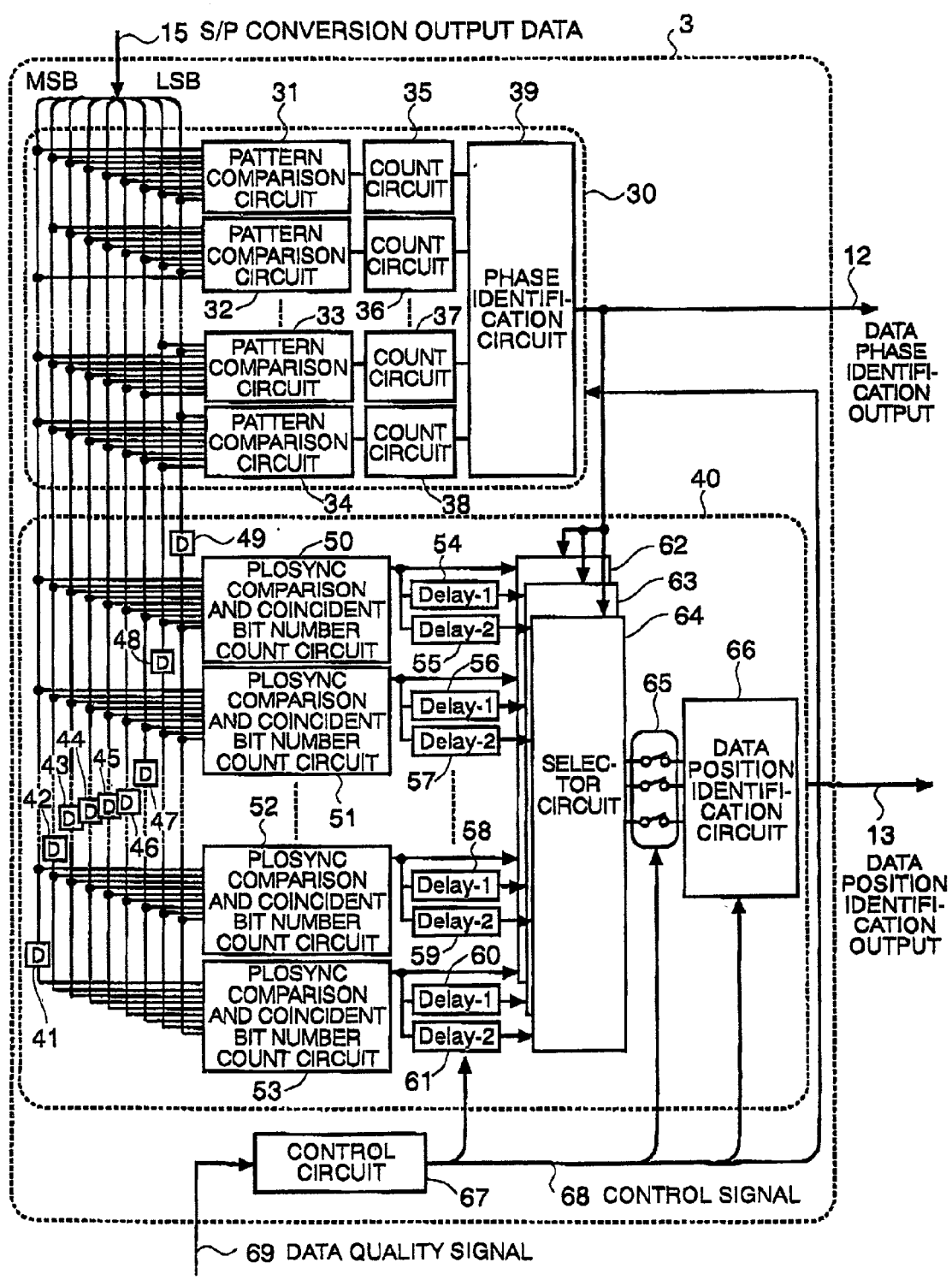
FIG. 11 is a diagram illustrating an example of the internal construction of data synchronization detection means according to an embodiment of the present invention.

FIG. 11 is a view given in explanation of the construction of data synchronization detection means 3 according to the present invention. In general terms, data synchronization detection means 3 comprises data phase detection means 30 that generates a data phase detection output 12 and data position detection means 40 than generates data position detection output 13. Serial/parallel conversion output 15 is input to data synchronization detection means 3. Serial/parallel conversion output 15 is of 9 bit width; the LSB side signal is successively input from the MSB side to flip-flop 41 to flip-flop 49. It is also input to pattern comparison circuits 31 to 34 and PLO_SYNC comparison and coincident bit count circuits 50 to 53.

In data phase detection means 30, first all pattern comparison circuits 31 to 34 compare the SP conversion output data with the pattern '0*0*0' in order for example to perform the operation of FIG. 5. Pattern comparison circuits 31 to 34 are of the same circuit layout, with their input connection ends being connected as shown in the drawing so as to effect a shift of one bit in each case. The outputs of pattern comparison circuits 31 to 34 are input to count circuits 35 to 38. Thus, when a bit sequence pattern is generated, count circuits 35 to 38 sum the number of such occurrences. The outputs of count circuits 35 to 38 are input to phase determination circuit 39 which determines the data phase by performing calculation for determination of the data phase, and outputs the determination result as data phase detection output 12.

In data position detection means 40, first of all comparison with the PLO_SYNC pattern is effected by PLO_SYNC comparison and coincident bit number count circuits 50 to 53. The number of coincident bits is thus counted and its value is output. PLO_SYNC comparison and coincident bit number count circuits 50 to 53 are of the same circuit layout, with their input connection ends being connected as shown in the drawing so as to effect a shift of one bit in each case. The outputs of PLO_SYNC comparison and coincident bit number count circuits 50 to 53 are input to selector circuit 62 and delay means 54 to 61. The outputs of delay means 54 to 61, delayed by a prescribed value, are input to select circuits 63 to 64. One phase of PLO_SYNC comparison and coincident bit number count circuits 50 to 53, delay means 54, 56, 58 and 64 or delay means 55, 57, 59, 61 is selected and its output is input to switch 65. The output of switch 65 is calculated by data position determination circuits 66, and output as data position detection output 13.

Since in this case it was assumed that the GAP pattern is the saw pattern as the PLO_SYNC pattern (shown by way of example in FIG. 18), the delay means 54 to 61 are used to associate the output of the PLO_SYNC comparison and coincident bit number count circuits 50 to 53 with the respective pattern positions, this output being shared. Also, in order to produce the action shown in FIG. 10, switch 65 is controlled by control signal 68, such as to make available for use only the portion which is effective for identification. Control signal 68 is generated by control circuit 67 using the data quality signal 69. Apart from this, control signal 68 is input to data phase detection means 30 and/or delay men 54 to 61 and/or data position identification circuit 66 to perform required operations.

Figure 13:
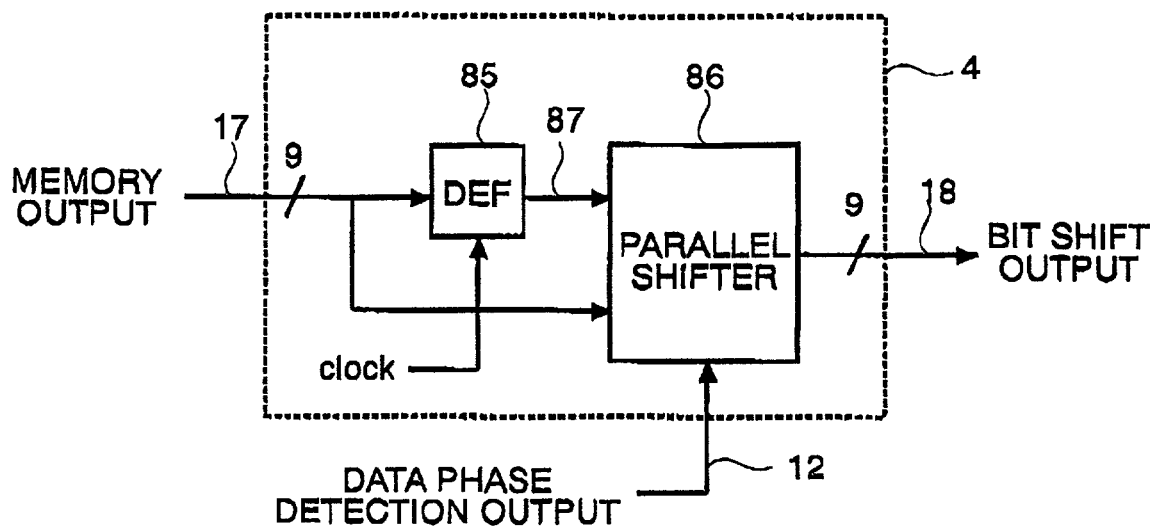
FIG. 13 is a diagram illustrating a modified example of the internal construction of a bit shift circuit employed together with data synchronization detection means according to an embodiment of the present invention.

FIG. 13 is a view given in explanation of the construction of a bit shift circuit 4 according to the present invention. Memory output 17 is input to bit shift circuit 4. Memory output 17 is input to the LSB bit side of flip-flop 85 and parallel shifter 86. The output 87 of flip-flop 85 is input to the MSB bit side of parallel shifter 86. Parallel shifter 86 outputs bit-shifted output 18 obtained by shifting the input data by a prescribed value such that output corresponding to the position of the modulation codeword partition can be achieved by data phase detection output 12.

The construction of a further data synchronization detection device will now be described using FIG. 2. In this construction, reduction of the size of the circuitry is achieve by serial bit input to data synchronization detection means 10. Input data 11 is input to data identification means 1. Data identification means 1 performs data identification of the input data 11 and inputs the data identification output to serial/parallel conversion means 5 and data synchronization detection means 10. Serial/parallel conversion means 5 outputs the data identification output with a bit width conforming to the code modulation bit width, and inputs this to memory 2. In memory 2 there are successively held identified data corresponding to the reproduced PLO_SYNC 91, DATA 93, ECC 94, and GAP 95. Data synchronization detection means 10 detects the number of occurrences of a specified bit sequence pattern in each phase, and, from this result, detects code-modulated codeword partitions of the reproduced data, and outputs the result as data phase detection output 12. Also, it finds the correlation between the PLO_SYNC pattern at the front part of the identified data and the GAP pattern at the rear part of the identified data, and thereby detects the codeword position that best coincides with these patterns, and outputs this as data position detection output 13. The data position detection output 13 is input to memory 2 and identified data stored in memory 2 is output from the position corresponding to the data start position and input to bit shift circuit 4. Bit shift circuit 4 outputs the identified data in code word units after performing bit shifting in accordance with the data phase detection output 12 such that this coincides with the codeword partitions; these are then input to code demodulation means 6. Code demodulation means 6 performs code demodulation corresponding to the code modulation that was performed on information recording, and outputs the result as output data 14.

Figure 12:
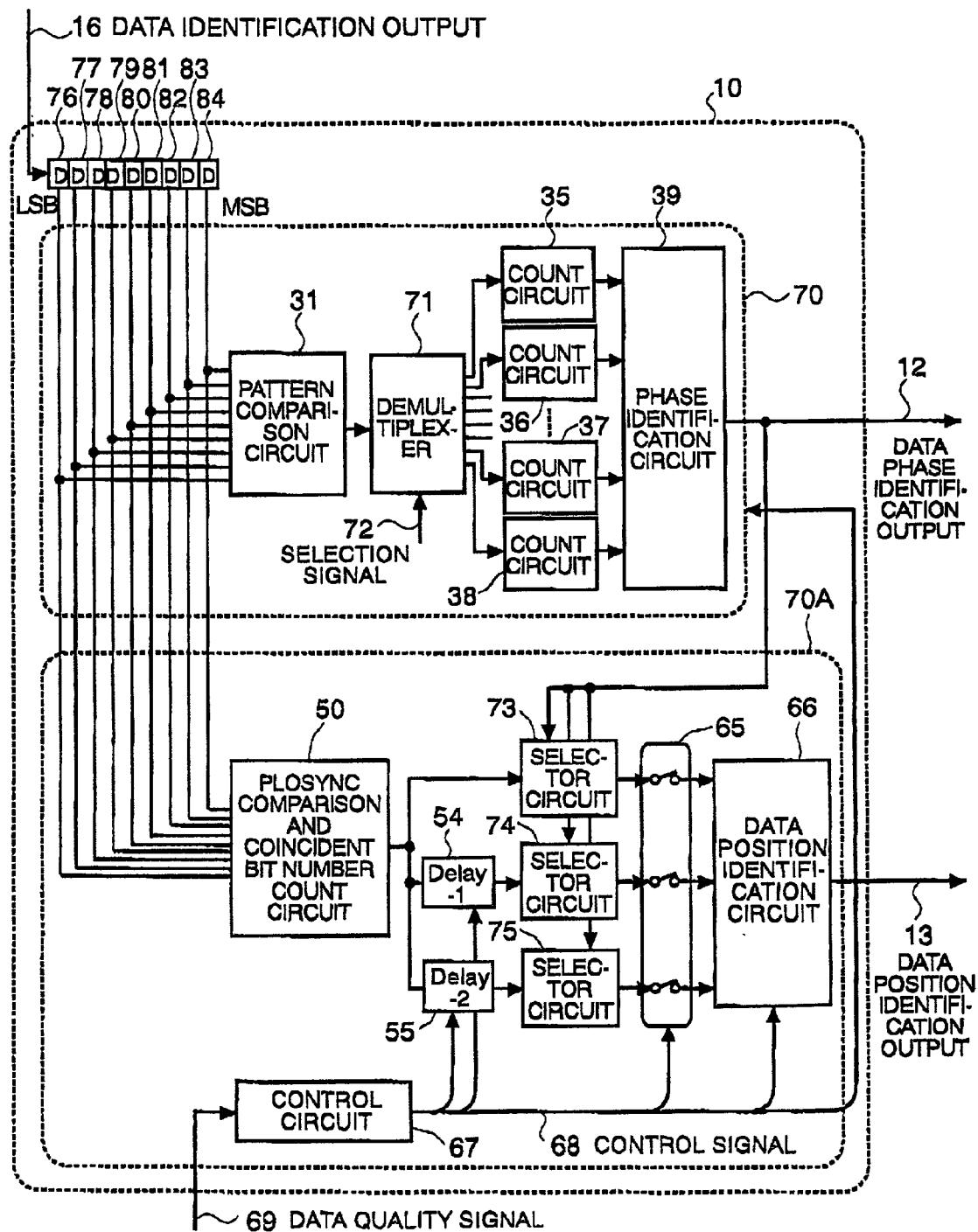
FIG. 12 is a diagram illustrating a modified example of the internal construction of data synchronization detection means according to an embodiment of the present invention.

FIG. 12 is a view given in explanation of the construction of further data synchronization detection means 10. In general terms, data synchronization detection means 10 comprises data phase detection means 70 that generates a data phase detection output 12 and data position detection means 70A that generates data position detection output 13. Data identification output 16 is input to data synchronization detection means 10. Data identification output 16 is successively input to shift registers 76 to 84. The outputs of shift registers 76 to 84 are input to pattern comparison circuits 31 and PLO_SYNC comparison and coincident bit count circuit 50.

In data phase detection means 70, first of all, pattern comparison circuit 31 effects comparison with the pattern '0*0*0' in order for example to implement the action of FIG. 5. Since, in pattern comparison circuit 31, the data identification output 16 appears shifted by one bit at a time with each bit clock, bit sequence comparison in each phase can be effected by a single circuit. However, operation has to be performed at each bit clock. The output of pattern comparison circuit 31 is selected and input to count circuits 35 to 38 by demultiplexer 71. When bit sequence patterns are generated, count circuits 35 to 38 count the number of occurrences. The outputs of count circuits 35 to 38 are input to phase identification circuit 39, where calculation is performed for data phase identification; data phase identification is thereby carried out and the identification results are output as data phase identification output 12.

In data position detection means 70A, first of all, PLO_SYNC comparison and coincident bit count circuit 50 performs comparison with the PLO_SYNC pattern. The number of coincident bits is thus counted and its value is output. The output of PLO_SYNC comparison and coincident bit count circuit 50 is input to selection circuit 73, delay means 54 and delay means 55. Delay means 54 and delay means 55 deliver the output of PLO_SYNC comparison and coincident bit count circuit 50, delayed by prescribed values, to selection circuit 74 and selection circuit 75. Selection circuits 73 to 75 select one phase in accordance with the data phase detection output 12, and input the output thereof to switch 65. The output of switch 65 is subjected to calculation processing by data position identification circuit 66, to detect the data position and is then output as data position detection output 13.

Since in this case it was assured that the GAP pattern is the same pattern as the PLO_SYNC pattern (shown by way of example in FIG. 18), delay means 54 and delay means 55 are used to associate the output of the PLO_SYNC comparison and coincident bit number count circuit 50 with the respective pattern positions, this output being shared. Also, in order to produce the action shown in FIG. 10, switch 65 is controlled by control signal 68, such as to make available for use only the portion which is effective for identification. Control signal 68 is generated by control circuit 67 using the data quality signal 69. Apart from this, control signal 68 is input to data phase detection means 70 and/or delay means 54, delay means 55 and/or data position identification circuit 66 to perform required operations.

The layout of FIG. 12 performs a completely equivalent action to that of FIG. 11. Although the front stage must operate with the bit clock period, the size of the circuit can be reduced.

Figure 14:
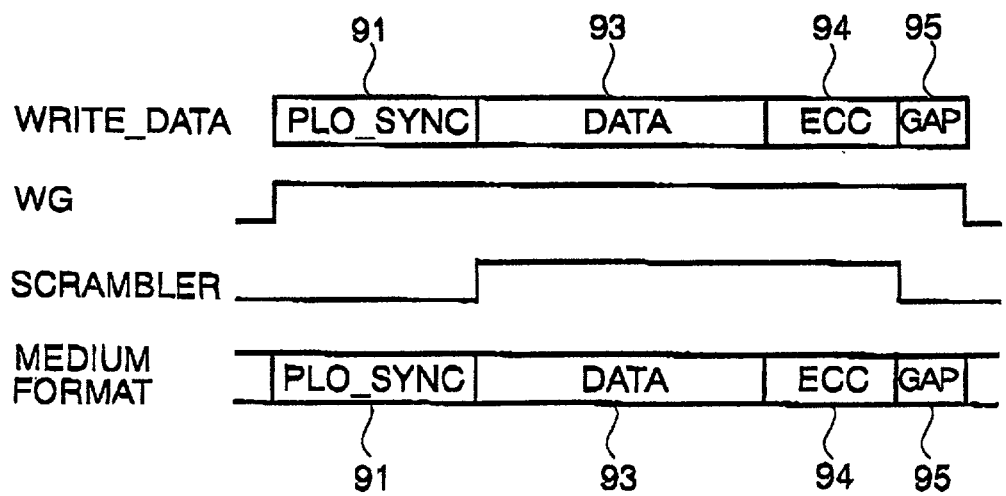
FIG. 14 is a timing chart illustrating an example of the sequence on data recording corresponding to data synchronization detection means according to an embodiment of the present invention.

FIG. 14 is a view given in explanation of the sequence during information recording according to the present invention. The write data constituting the information that is recorded are the PLO_SYNC, DATA, ECC and GAP; these are delivered from the magnetic disc control circuit. The gate signal WG for writing is respectively associated with these. Also, scrambling is applied to the DATA and ECC information by a scrambler signal for scrambling the data. As a result, the PLO_SYNC, scrambled DATA, scrambled ECC, and GAP are recorded on the recording medium. Although in this case the data of the GAP section is not scrambled, if the pattern that is written is known, scrambling could be applied.

Figure 15:
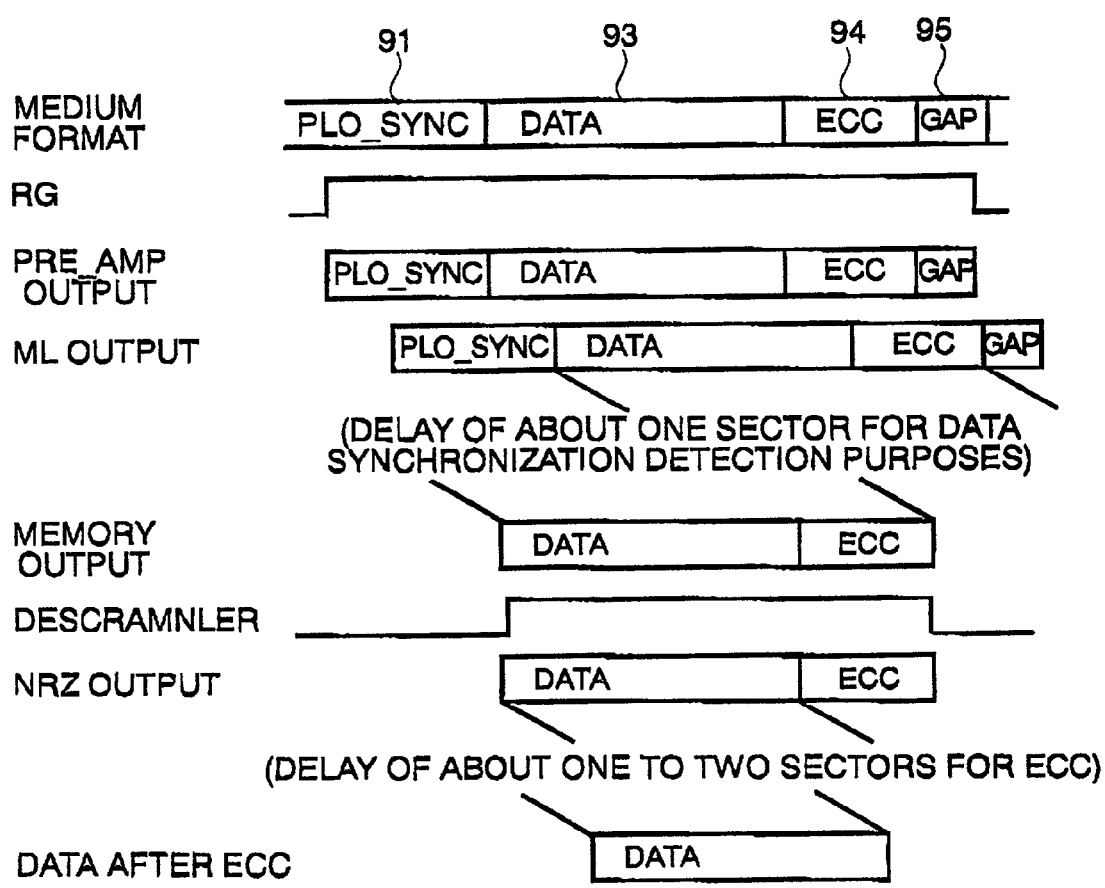
FIG. 15 is a timing chart illustrating an example of the sequence on data reproduction corresponding to data synchronization detection means according to an embodiment of the present invention.

FIG. 15 is a view given in explanation of the sequence on information reproduction according to the present invention. The PLO_SYNC, DATA, ECC and GAP recorded on the information recording medium are reproduced in correspondence with the gate signal RG for reading. Signals corresponding to PLO_SYNC, DATA, ECC, and GAP appear in the Pre_AMP output, which is the reproduction output of the reproduction head. Signal processing is performed on this output using a filter or equalizer, and data identification is effected by the data identification means. The output of this is the ML output, and this has some delay from the Pre_AMP to allow for data identification. Data synchronization by the data synchronization detection means is performed concurrently with storage of the ML output in memory. A delay of the order of about one sector is generated for data synchronization detection. When data synchronization detection is performed reproduced data is output from memory. What is output from memory is DATA and the ECC. Code demodulation and descrambling are performed on the memory output so that NRZ data is output. The NRZ data is subjected to ECC error correction processing to obtain DATA which is output as reproduced data. Delay in the amount of about one to two sectors is then generated due to this ECC error correction processing.

Figure 19:
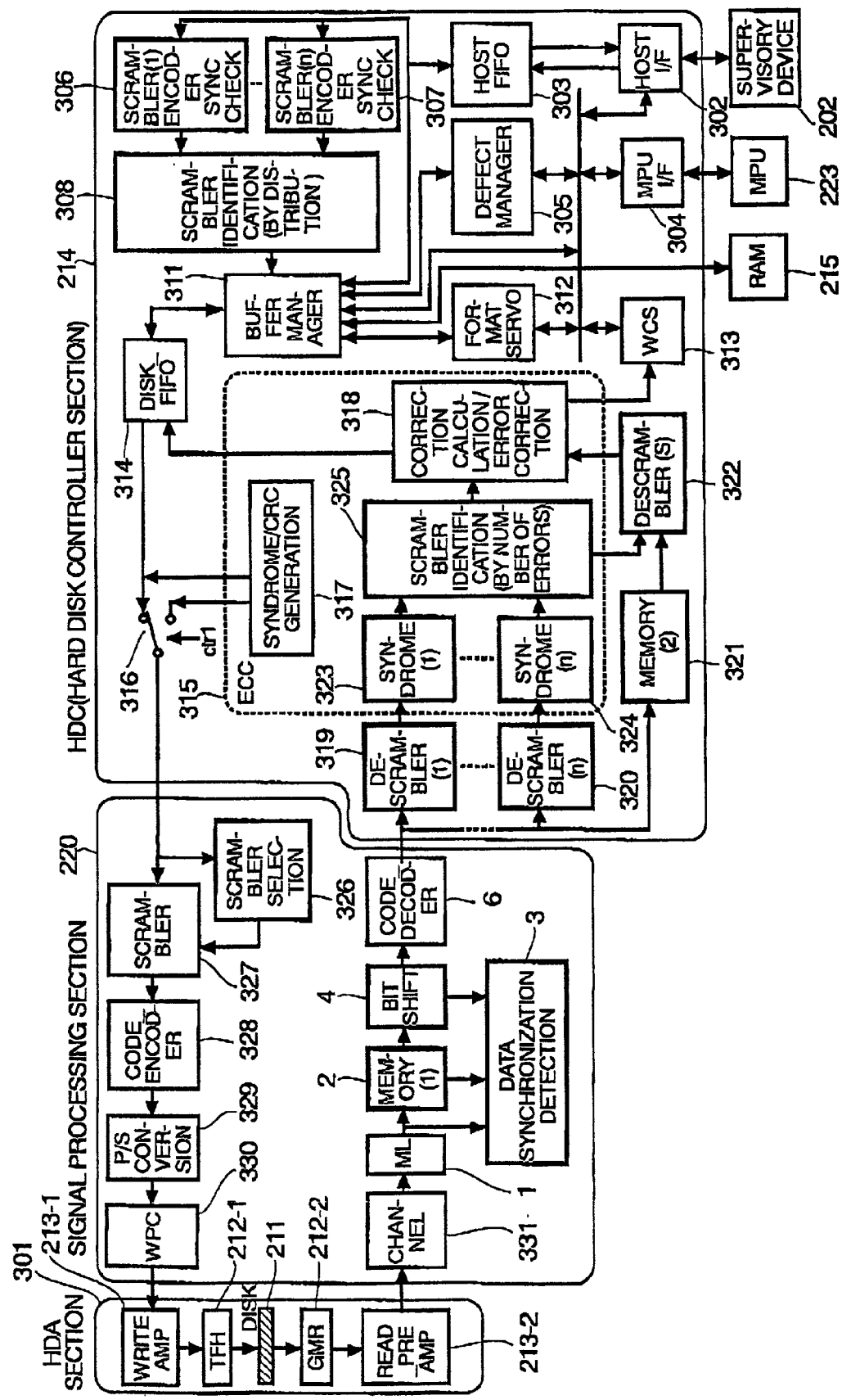
FIG. 19 is a block diagram given in explanation of an example of the circuit layout of a magnetic disc device wherein the data synchronization detection technique according to an embodiment of the present invention has been applied.

FIG. 19 is a view given in explanation of the circuit diagram of a magnetic disc device. The circuitry of the data system comprises, in general terms, an HDA (Head_Disc_Assembly) section 301, signal processing section 220, and HDC (Hard_Disc_Controller) 214 section.

First of all, the operation of recording information will be described.

When information is recorded, the information to be recorded is transferred from a supervisory device 202 and enters HDC 214. HDC 214 then inputs this through Host_I/F 302, and Host_FIFO 303, to Buffer_Manager 31 and scrambler check circuits 306 to 307 for scrambler identification for data synchronization detection.

The number of scrambler check circuits depends on the number of scramblers that are provided as candidate scramblers. An example in which four are employed will be described. As the scramblers which are provided, for example four scramblers are provided, such as two scramblers of different generation polynomial from the original values of the scrambler in order to pent the situation of data synchronization with data after scrambling becoming impossible and, in addition, two scramblers with different scrambler initial values, in order to arrange for a large Hamming distance from the PLO_SYNC pattern when encoding by scrambling the initial data, in order to ensure that data position detection is performed accurately. In order to perform data position detection accurately, it is also possible to forcibly write a pattern having a large Hamming distance from the PLO_SYNC pattern immediately in front of the initial data; if this is done, the number of scramblers that need to be prepared can be reduced.

The results of the scrambler check circuits 306 to 307 are input to the scrambler identification circuit 308, where the scrambler to be applied is selected, and this information is transferred to Buffer_Manager 311. Buffer_Manager 311 bolds in a data buffer 215 the information that is sent thereto from the supervisory device 202 and the scrambler information selected for this information. If information recording to magnetic disc 211 has been enabled, the information that is sent thereto from supervisory device 202 and the scrambler information selected for this information are transferred from data buffer 215 to signal processing section 220 through Buffer_Manager 311, Disk_FIFO 314, and switch 316. During this process, syndrome generation and CRC generation for error correction by syndrome and CRC generating circuit 317 are performed, and the information is appended through switch 316.

Signal processing section 220 uses scrambler selection circuit 326 to select the scrambler in accordance with the scrambler information in the transferred information, and uses scrambler circuit 327 to perform scrambling. After this, data encoding etc are performed, and the data are transferred to HDA section 301, for the information to be recorded on magnetic disc 211.

Figure 23:
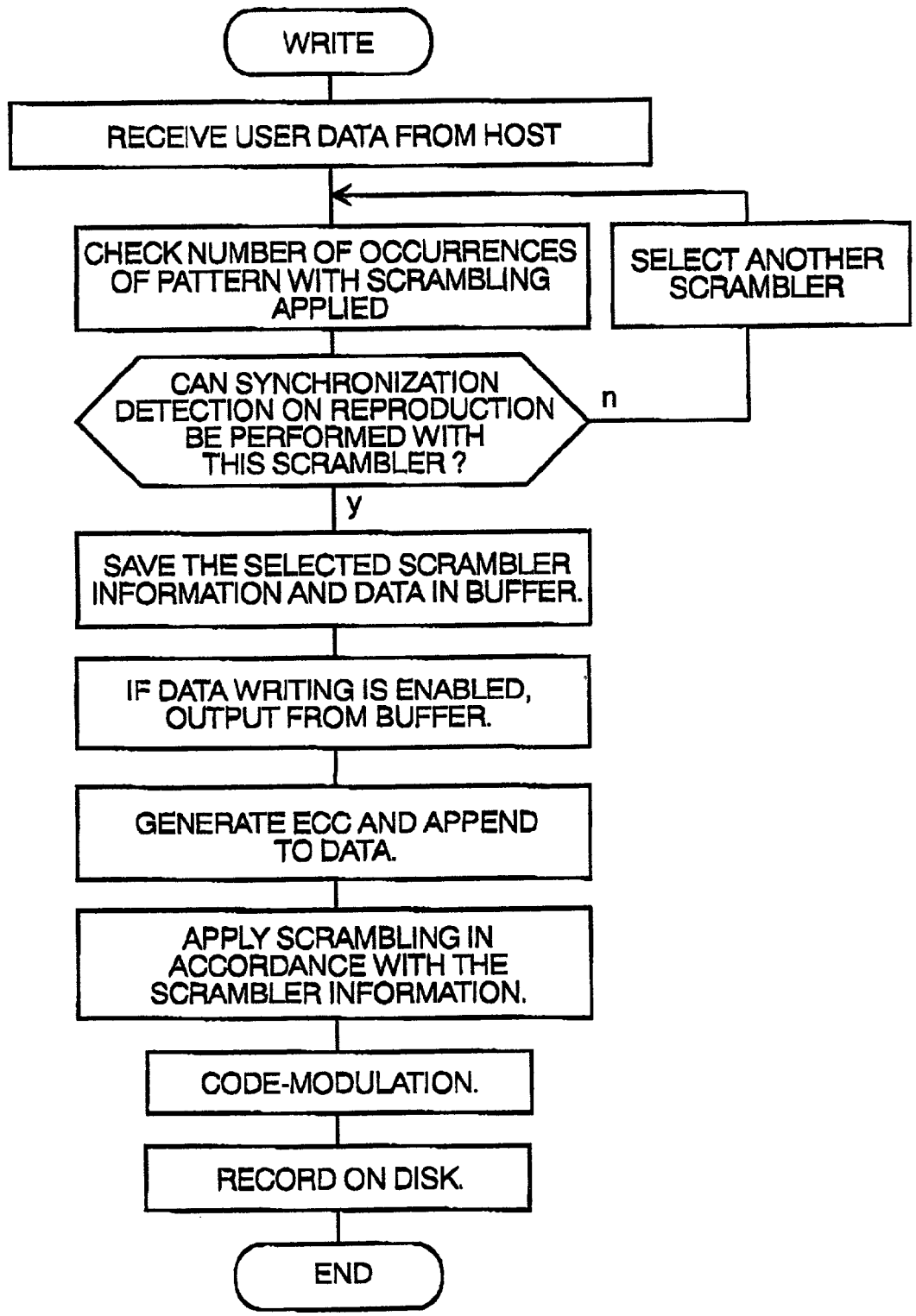
FIG. 23 is a flow chart illustrating an example of the action on data recording with the data synchronization detection technique according to an embodiment of the present invention.

The processing during the data recording according to the embodiment described above is shown by way of example in the flow chart of FIG. 23.

Next, the operation of reproducing the information will be described.

When reproducing information, if there is a request for information reproduction from a supervisory device 202, and reproduction of information from magnetic disc 211 has been enabled, after passing from magnetic disc 211 and through reproduction magnetic head 212-2, Channel 331 that performs waveform equalization etc, and data identification means 1, data identification is performed. The identified data is input to memory 2 and data synchronization detection means 3, where data synchronization is performed, and the synchronized data is output from bit shift circuit 4 and, after being subjected to code demodulation by code demodulation means 6, the data is transferred to HDC 214.

HDC 214 inputs the transferred data to memory 321 and descramblers 319 to 320. These descramblers correspond to the scrambler check circuits 306 to 307 when recording, and are of the same number. Syndrome calculation for error correction is performed by syndrome calculating circuits 323 to 324 in accordance with the data descrambled by descramblers 319 to 320.

The syndrome calculation circuits also match the number of descramblers. Using the outputs of syndrome calculation circuits 323 to 324 which perform syndrome calculation, a descrambler is decided upon by using the descrambler determination circuit 325 to determine the respective number of errors and thus to decide which of these has the smallest number of errors. If there is nothing that is capable of error correction, an error that is incapable of correction by any means is deemed to have occurred and the fact that an uncorrectable error has occurred is reported through WC 313 etc that controls the recording and reproduction operation, so that the necessary action, such as retrying, can be performed. Errors of a range that is capable of correction will now be described.

Descrambler circuit 322 selects a descrambler in accordance with the descrambler information determined by descrambler determination circuit 325 and descrambles the data form memory 321. Using the descrambled data and error information from descrambler determination circuit 325, error correction circuit 318 corrects data errors and, passing the data through Disk_FIFO 314 and Buffer_Manager 311, temporarily stores the data in data buffer 215.

If data transfer to the supervisory device 202 has been enabled, data transfer to supervisory device 202 is effected from data buffer 215 through Buffer_Manager 311, Host_FIFO 303, and Host_I/F 302.

Figure 24:
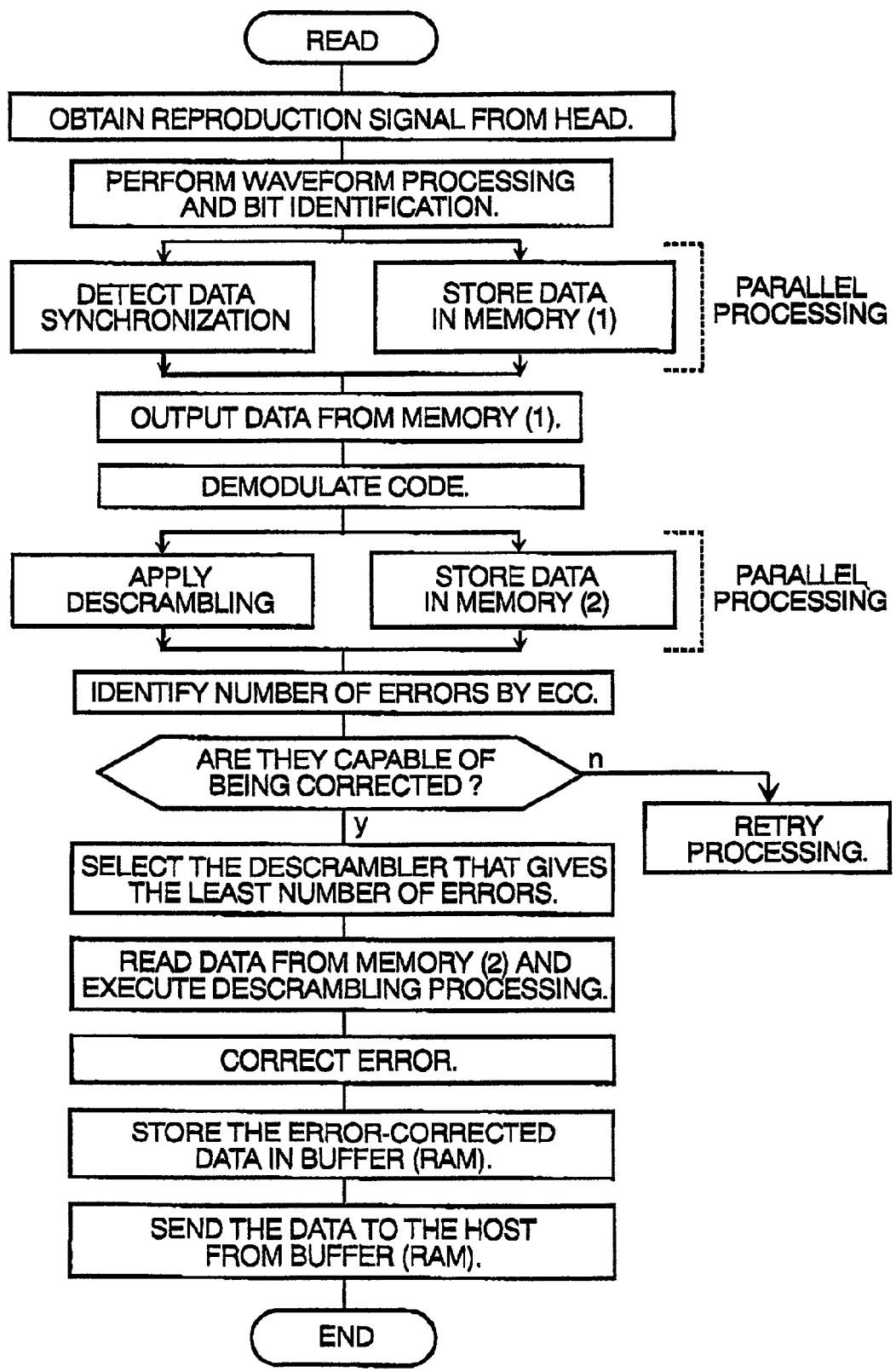
FIG. 24 is a flow chart illustrating an example of the action on data reproduction on with the data synchronization detection technique according to an embodiment of the present invention.
Figure 25:
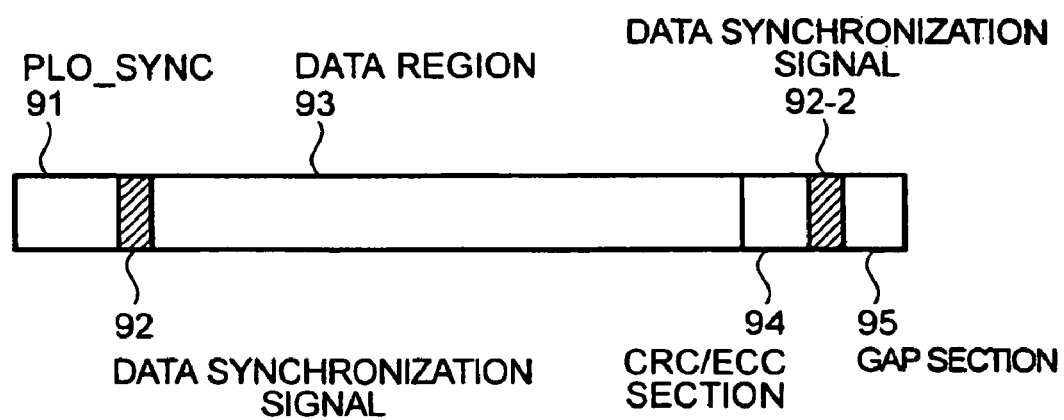
FIG. 25 is a diagram given in explanation of the data format layout according to the prior art.

An example of data reproduction processing in accordance with the embodiment described above is illustrated in the flow chart of FIG. 24.

Figure 20:
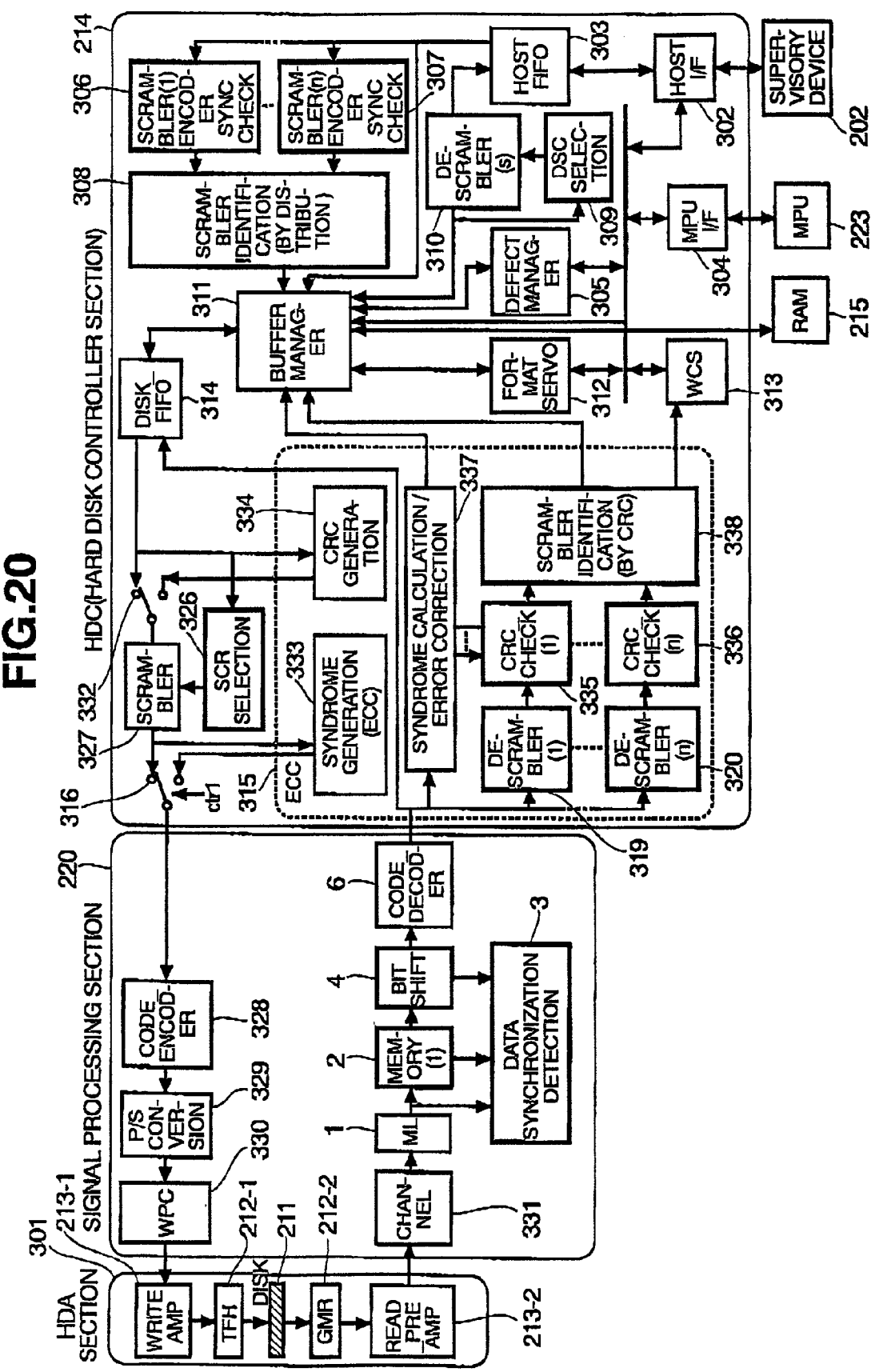
FIG. 20 is a block diagram given in explanation of a modified example of the circuit layout of a magnetic disc device to which the data synchronization detection technique according to an embodiment of the present invention has been applied.

FIG. 20 is a diagram illustrating an example of the circuit layout in a magnetic disc device according to a modified example. In the example of FIG. 19, the construction was such that a descrambler was selected for which the number of errors was a minimum, by error correction syndrome calculation. In the construction of the modified example of this FIG. 20, the advantage is obtained that error correction during reproduction can be performed independently of a descrambler by generating error correction syndromes for scrambled data. In general terms, the data system circuitry comprises an HDA section 301, signal processing section 220, and a HDC (Hard_Disk_Controller) 214 section.

The operation of recording information will now be described.

When information is to be recorded, information to be recorded is transferred from supervisory device 202 and enters HDC 214. In HDC 214, input is performed through Host_I/F 302, Host_FIFO 303 to Buffer_Manager 311 and scrambler check circuits 306 to 307 for deciding on a scrambler for data synchronization detection.

The scrambler check circuits are as described above, in accordance with the number of scramblers prepared as candidate scramblers.

The results of the scrambler check circuits 306 to 307 are input to scrambler determination circuit 308 when the scrambler to be applied is selected, and this information is transferred to Buffer_Manager 311. Buffer_Manager 311 holds in data buffer 215 information sent from supervisory device 202 and the scrambler information that is selected by this information. If recording of information on magnetic disc 211 has became enabled, the information arriving from supervisory device 202 and the scrambler information selected by this information are transferred from data buffer 215 through Buffer_Manager 311, Disk_FIFO 314, switch 332, scrambler circuit 327, and switch 316 to signal processing section 220. Scrambler selection of scrambler circuit 327 is performed by scrambler selection circuit 326 in accordance with the scrambler information in the incoming information. Also, en route, CRC generation is performed by CRC generating circuit 334, so that this can be input to scrambler circuit 327 by switch 332. Scrambling is performed on the CRC that has been added to the data by syndrome generating circuit 333, so that this can be transferred to signal processing section 220 by switch 316.

Signal processing section 220 performs data encoding etc. before transferring the data to HDA section 301, where the information is recorded on magnetic disc 211.

Next, the operation of information reproduction will be described.

In reproducing information, if there is a request for information reproduction from supervisory device 202 and reproduction of information from magnetic disc 211 is enabled, data identification is performed from magnetic disc 211 through reproduction magnetic head 211-2, Channel 331 that performs waveform equalization etc, and data identification means 1. The identified data is input to memory 2 and data synchronization detection means 3 where data synchronization is performed and the synchronized data is output from bit shift circuit 4 and code demodulated data is transferred to HDC 214 by code demodulation means 6.

HDC 214 inputs the incoming data to disc_FIFO 314, syndrome calculation circuit 337 and descramblers 319 to 320. The data that is input to disc_FIFO 314 passes through Buffer_Manager 313 and the data is then temporarily held in data buffer 215. Syndrome calculation circuit 337 performs syndrome calculation and error correction calculation based on this; if there is an error, the data in the data buffer 215 is corrected through Buffer_Manager 311. The descrambler descrambles the reproduced data. The result is input to CRC check circuits 335 to 336 and the CRC calculation result after correction is found from the error information found by CRC calculation and syndrome calculation circuit 337. This result is input to the scrambler determination circuit so that a CRC calculation result without error is selected for descrambling. These scramblers correspond to the scrambler check circuits 306 to 307 on recording and are the same in number as in the previous example. If errors cannot be eliminated by the CRC calculation, an error that is incapable of correction by any means is deemed to have occurred and this is reported through WCS 313 etc that controls the recording and reproduction operation, so that the necessary action, such as retrying, can be performed. Errors of a range that is capable of correction will now be described.

The descrambler information that has been found is held in data buffer 215 together with the data, after passing through Buffer_Manager 311.

If data transfer to a supervisory device 202 is enabled, data and descrambler information are read from data buffer 215 through Buffer_Manager 311, as a result of which descrambler selection circuit 309 selects a descrambler of descrambler circuit 310 and executes descrambling; data transfer to supervisory device 202 is then performed through Host_FIFO 303 and Host_I/F 302.

Figure 21:
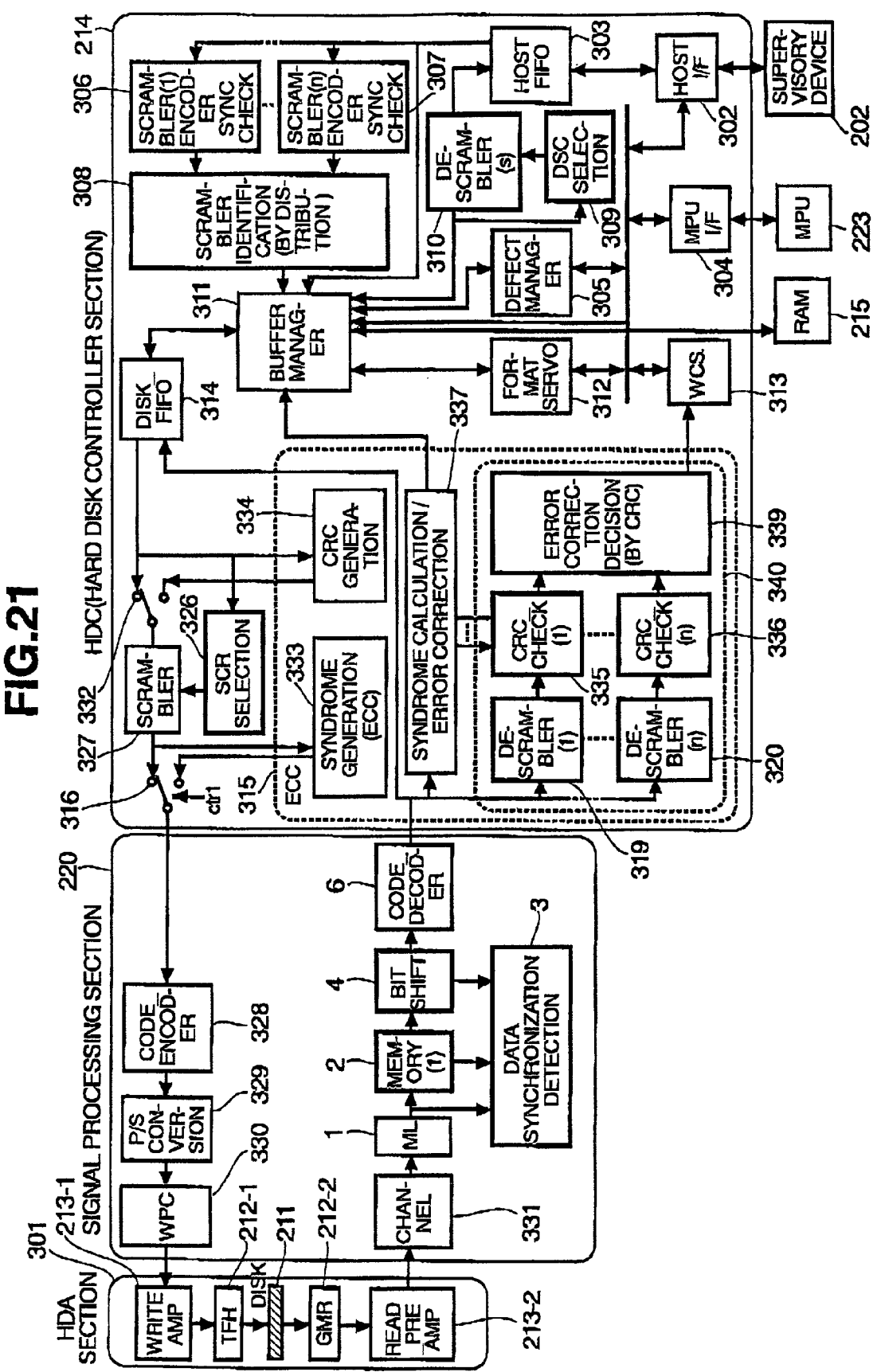
FIG. 21 is a block diagram given in explanation of a modified example of the circuit layout of a magnetic disc device to which the data synchronization detection technique according to an embodiment of the present invention has been applied.

FIG. 21 is a diagram illustrating the circuit layout in a magnetic disc device according to yet to a further modified example according to this embodiment.

In the example of FIG. 20, a construction was adopted in which reliable data error correction was achieved by error correction syndrome calculation being performed on the scrambled data. In addition, in this case, the construction is such that error correction and descrambling can be more reliably performed by, in the event of data recording, recording together with the scrambler information on a magnetic disc 211 constituting the information recording medium and, in the event of data reproduction, also reproducing the scrambler information together with the data. The circuitry of the data system in general terms, an HDA section 301, signal processing section 220, and HDC (Hard_Disc_Controller) 214 section.

First of all, the action on information recording will be described.

The circuit construction and action on information recording are the same as in the case of FIG. 20. However, when selection of the scrambler of scrambler circuit 327 is performed by scrambler selection circuit 326 in accordance with the scrambler information, all of the scrambler information without exception is transferred to the signal processing section 220. Furthermore, signal processing section 220 transfers the scrambler information to HDA section 301 together with the data and records it on magnetic disc 211.

Next, the action on information reproduction will be described.

When reproducing information, if there is a request for information reproduction from a supervisory device 202, and reproduction of information from magnetic disc 211 has been enabled, after passing from magnetic disc 211 and through reproduction magnetic head 212-2, Channel 331 that performs waveform equalization etc, and data identification means 1, data identification is performed. The identified data includes the previously recorded scrambler information. The identified data is input to memory 2 and data synchronization detection means 3, were data synchronization is performed, and the synchronized data is output from bit shift circuit 4 and, after being subjected to code demodulation by code demodulation means 6, the data is transferred to HDC 214.

HDC 214 inputs the transferred data to Disk_FIFO 314, syndrome calculation circuit 337 and descramblers 319 to 320. The data that has been input to Disk_FIFO 314 passes through Buffer_Manager 311 and is temporarily held in data buffer 215. The data that is temporarily held in data buffer 215 also includes scrambler information. Syndrome calculation circuit 337 performs syndrome calculation and error correction calculation based on this, and, if errors are present, corrects the data in data buffer 215, through Buffer_Manager 311.

Descrambler(1) 319 to Descrambler(n) 320 descramble the reproduced data. The result of this is input to CRC check circuits 335 to 336 and the corrected CRC calculation result is found from the CRC calculation and the error information found by syndrome calculation circuit 337. This result is input to error correction decision circuit 339, which decides whether the error correction processing was correct or not. If an error is present, the fact that an uncorrectable error has occurred is reported through WCS 313 etc that controls the recording and reproduction operation, so that the necessary action, such as retrying, can be performed. The processing in descramblers 319 to 320, CRC check circuits 335 to 336, and error correction decision circuit 339 is arranged and operates in this way, in order to effect immediate detection of the presence of errors in the reproduced information. If there is sufficient margin terms of time and circuitry for such processing, it is also possible to identify the presence of mis-correction in the error correction by using the reproduced scrambler information to perform descrambling on the error-corrected data, before performing CRC calculation processing.

If data transfer to the supervisory device 202 has been enabled, data and descrambler information are read through Buffer_Manager 311 from data buffer 215, and a descrambler of descrambler circuit 310 is selected by descrambler selection circuit 309, and descrambling is performed; data transfer is then effected to supervisory device 202 through Host_FIFO 303 and Host_I/F 302.

Figure 16:
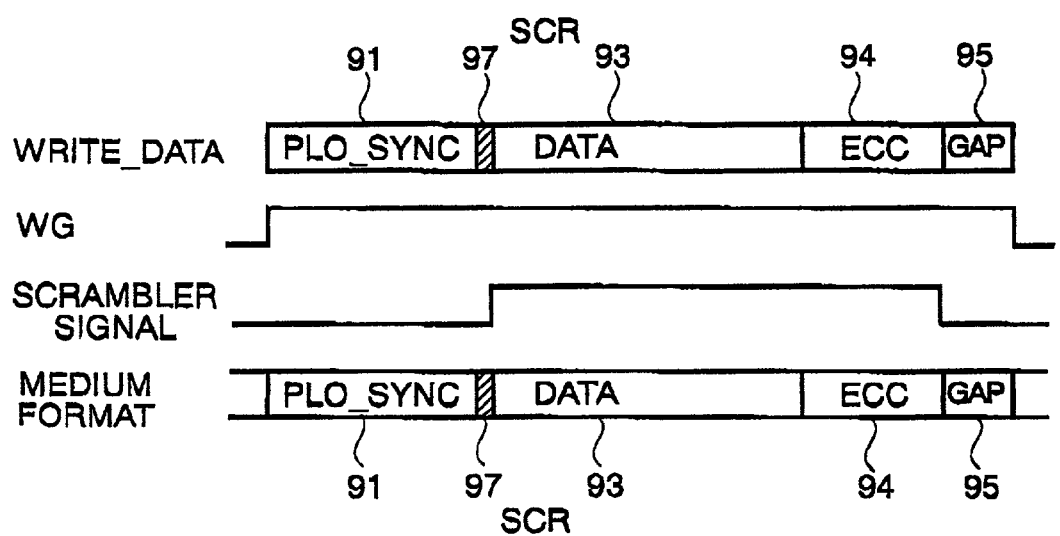
FIG. 16 is a timing chart illustrating a modified example of the sequence on data recording corresponding to data synchronization detection means according to an embodiment of the present invention.

FIG. 16 is a view given in explanation of a time chart and format when writing scrambler information of the example of FIG. 21 to magnetic disc 211.

The Write_Data constituting the information that is recorded comprises PLO_SYNC 91, scrambler information SCR 9 7, DATA 93, ECC 94 and GAP 95; these are sent from the magnetic disc control circuit. The gate signal WG for writing is associated with these. Also, scrambling is applied to the DATA and ECC information by means of the scrambler signal in order to scramble the data. As a result, the PLO_SYNC 91, SCR 97, scrambled DATA 93, scrambled ECC 94 and GAP 95 are recorded on the recording medium. In this case, no scrambling was applied to the data of the GAP section, but, if the written pattern is known, scrambling could be applied.

Figure 17:
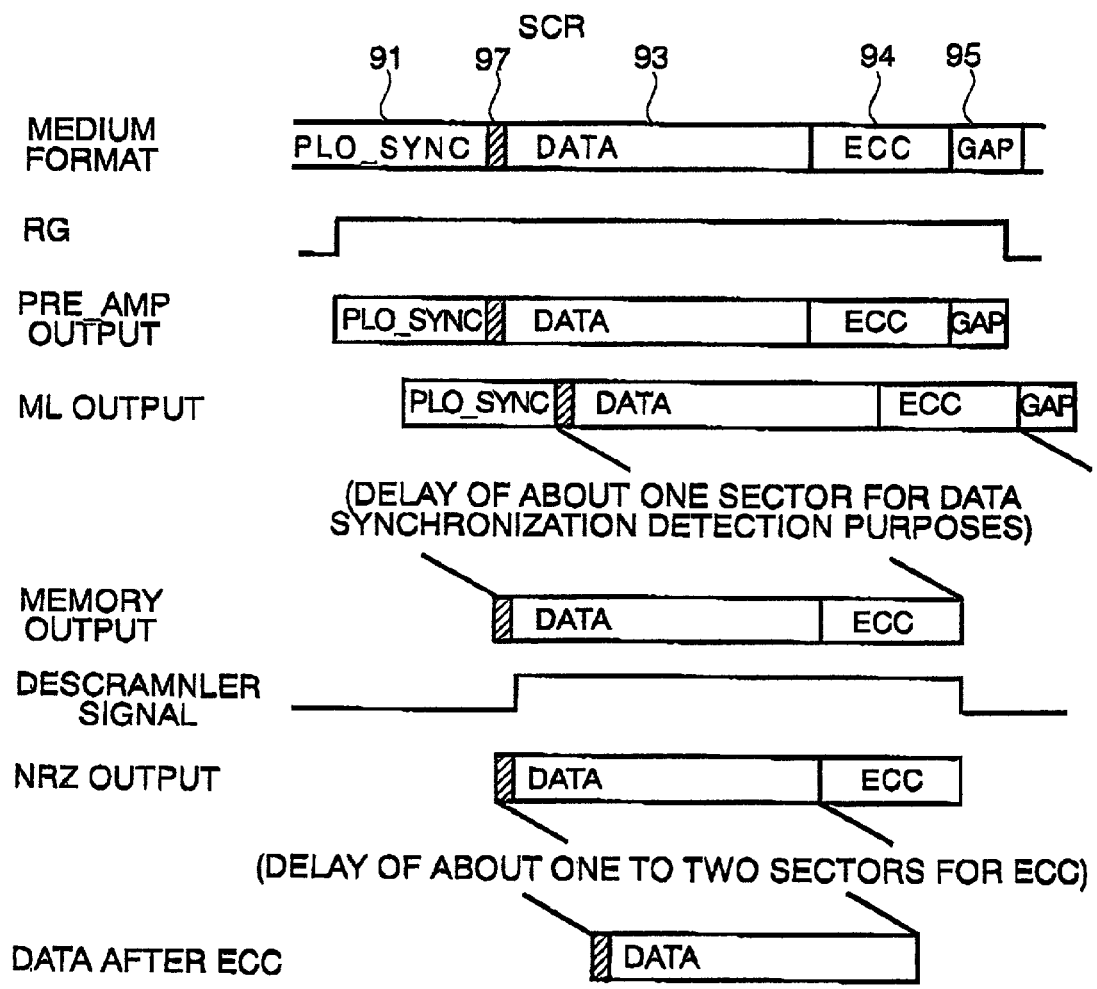
FIG. 17 is a timing chart illustrating a modified example of the sequence on data reproduction corresponding to data synchronization detection means according to an embodiment of the present invention.

FIG. 17 is a view illustrating a time chart and format in the case of reproduction of scrambler information of the example of FIG. 21 from a magnetic disc.

The PLO_SYNC 91, SCR 97, DATA 93, ECC 94 and GAP 95 that are recorded on the information recording medium are reproduced in correspondence with a gate signal RG for purposes of reading. Signals corresponding to PLO_SYNC 91, SCR 97, DATA 93, ECC 94 and GAP 95 appear in the Pre_AMP output, which is the reproduction output of the reproduction head. Signal processing is performed on this output using a filter or equalizer, and data identification is effected by the data identification means. The output of this is the ML output, and this has some delay from the Pre_AMP output to allow for data identification. Data synchronization by the data synchronization detection means 3 is performed concurrently with storage of the ML output in memory (1)2. A delay of the order of about one sector is generated for data synchronization detection. When data synchronization detection is performed reproduced data is output from memory 1(2). What is output from memory 1(2) is SCR 97, DATA 93 and ECC 94. Code demodulation and descrambling are performed on the memory output so that NRZ data is output. The NRZ data is subjected to ECC error correction processing to obtain SCR 97 and DATA 93 which are output as reproduced data. Delay in the amount of about one to two sectors is then generated due to this EOC error correction processing.

It should be noted that, although, in an example where a scrambler is employed, PLO_SYNC 91 and DATA 93 are not directly adjacent, since SCR 97 is the scrambler of the data, it can be considered as part of DATA 93. This can therefore be regarded as an example were PLO_SYNC 91 and DATA 93 are adjacent, in the same way as the example described in FIG. 18.

Figure 22:
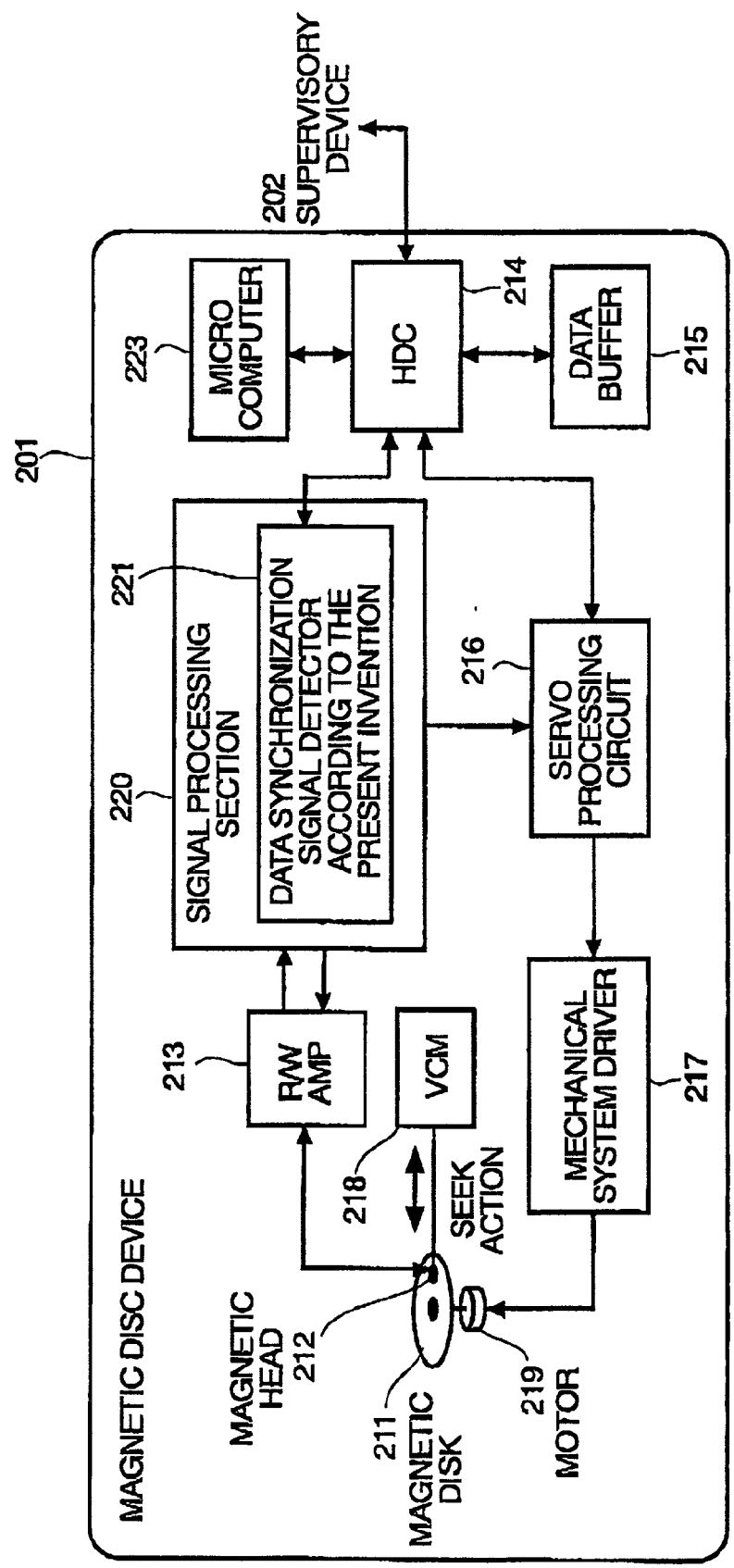
FIG. 22 is a block diagram given in explanation of an example of the overall construction of a magnetic disc device to which the data synchronization detection technique according to an embodiment of the present invention has been applied.

FIG. 22 illustrates an example of a magnetic disc device employing a data synchronization detection technique in accordance with this embodiment. Magnetic disc device 201 comprises magnetic disc 211, magnetic head 212, R/W AMP 213, HDC 214, microcomputer 223, data buffer 215, servo processing circuit 216, mechanical system driver 217, VCM 218, motor 219 and signal processing section 220. Signal processing section 220 includes signal processing means of construction as described above or signal processing means of another construction according to the present invention, or data synchronization detection means of the construction described above or data synchronization detection means 221 of another construction according to the present invention. HDC 214 comprises an HDC of the construction described above, or an HDC of another construction according to the present invention.

Magnetic disc device 201 of this construction can be implemented by a magnetic disc device in which there are few data synchronization detection errors. Also, magnetic disc device 201 of this construction makes it possible to implement a magnetic disc device in which the format efficiency of the magnetic disc 211 which is the information recording medium is improved so that more user data can be stored.

As described above, with the data synchronization detection technique of this embodiment, data synchronization detection can be realized using the code-modulated data itself that is to be recorded/reproduced, thereby making it possible to match the data synchronization detection performance with the data identification performance. Also, statistical processing can be performed using all the ordinary code-modulated data. Accurate data synchronization detection can thereby be achieved with few errors.

Also, a data synchronization signal region which was provided in a conventional data format is completely unnecessary, and there is no need to record a data synchronization signal even on the information recording medium such as the magnetic disc 211, so an improved format efficiency of the information recording medium can be achieved.

Although the invention made by the present inventors has been described in detail with reference to an embodiment, the present invention is not restricted to the above embodiment and could of course be altered in various ways without departing from its essence.

For example, although, in the above description, a magnetic disc device was taken as an example in the description of a data synchronization signal detection technique according to the present invention, this could alternatively be employed also in signal processing circuits for information processing, integrated circuits, magneto-optic disc devices, optical disk devices and floppy disk devices.

The present invention can be used in combination with a format for writing a data synchronization signal on a recording medium according to the conventional method. Also, information recorded in the format produced by the conventional method can be reproduced by the method of the present invention.

Although in the description relating to the present invention up to this point, the case was described in which data synchronization detection was arranged to be performed using the data information of a single sector, if data synchronization detection is possible using data collected at an intermediate point of a sector, identification could be performed at that time-point.

Although the description relating to the present invention up to this point was given for the case of 8/9 code modulation, other code conversions are also possible and it could also be applied to coding rates of 16/17, 32/34, or 64/65 etc.

Apart from the practical examples described above, the present invention could also be applied to a so-called split sector format, in which the data sector is split by a servo region.

Data position detection could also be performed by accessing data in memory after data phase detection has been achieved.

The data synchronization detection method of the present invention could also be implemented by software processing.

According to the present invention the benefit is obtained that, when performing data synchronization detection, detection errors can be reduced.

Also according to the present invention the benefit is obtained that the data synchronization detection performance can be improved corresponding to or exceeding improvement in reproduction performance of the data section.

Also according to the present invention the benefit is obtained that the format efficiency of the information recording medium can be improved.

Also according to the present invention the benefit is obtained that a data synchronization detection device with little detection error and an information recording/reproduction device comprising this can be provided.

What is claimed is:

1. A method of detecting data synchronization comprising:
   storing a discriminated bit string output of code-modulated reproduced data;
   detecting an occurrence of a specified bit pattern in every bit phase of every period of bits in a bit string of the discriminated bit string;
   counting a number of the occurrences of the specified bit pattern in every bit phase;
   discriminating original codeword boundaries of said discriminated bit string output of code-modulated reproduced data based on the number of occurrences of the specified bit pattern; and
   outputting said stored discriminated bit string in synchronization with said discriminated original codeword boundaries.

2. The method of detecting data synchronization according to claim 1, further comprising:
   finding the correlation of a front section of the discriminated bit string output of the code-modulated reproduced data and a phase locked oscillator synchronization pattern; and
   specifying a position of a data portion based on the correlation thus found.

3. The method of detecting data synchronization according to claim 1, further comprising:
   finding the correlation of a rear section of the discriminated bit string output of said code-modulated reproduced data and a GAP pattern for correctly reproducing the final bit of said reproduced data; and
   specifying the position of a data portion based on the correlation thus found.

4. The method of detecting data synchronization according to claim 1, further comprising:
   finding, for a data position detection pattern provided at an intermediate position in the data, the correlation of an intermediate portion of the discriminated bit string output of code-modulated reproduced data and a data position detection pattern; and
   specifying the position of a data portion based on the correlation thus found.

5. The method of detecting data synchronization according to claim 1, further comprising selecting reproduced data used for data synchronization detection, or reproduced data used for position detection of a data portion, by means of a data quality signal representing the probability that there is an error in the discriminated bit string output of the reproduced data.

6. A method of recording information comprising:
   a step for scrambling data by two or more types of scrambler;
   a step for code-modulating the scrambled data;
   a step for counting the number of occurrences of a specified bit pattern in every bit phase of every period of bits in a discriminated bit string output of reproduced data
   a step for determining whether or not the position of a code-modulation codeword boundary of the data can be specified by a prescribed threshold value of the number of occurrences of the specified bit pattern; and
   a step for recording data obtained by code-modulation of data scrambled by the scrambler which has been determined to be configured for specifying the position of the code-modulation codeword boundary.

7. The method of recording information according to claim 6, further comprising a step for recording the information of the scrambler which has been determined to be configured for specifying the position of the code-modulation codeword boundary.

8. A method of reproducing information comprising:
   detecting data synchronization using the data synchronization detection method according to claim 1;
   code-demodulating the data in accordance with a specified code modulation phase;
   descrambling the code-demodulated data with two or more types of descrambler;
   detecting error in respect of the descrambled data; and
   outputting as reproduced data the output data of the descrambler for which the number of detected errors is smallest.

9. A method of reproducing information using the output data of a descrambler as reproduced data, comprising:
   inputting reproduced data including descrambler information;
   detecting data synchronization, using the data synchronization detection method according to claim 1;
   code-demodulating data in accordance with a specified code-modulation phase;
   error-correcting the code-demodulated data; and
   descrambling in accordance with scrambling information included in the error-corrected data.

* * * * *